(12) United States Patent
Takamiya

(10) Patent No.: US 10,204,000 B2
(45) Date of Patent: Feb. 12, 2019

(54) APPARATUS AND METHOD FOR MANAGING DUMP DATA FOR CAUSE ANALYSIS OF A MEMORY LEAK

(71) Applicant: FUJITSU LIMITED, Kawasaki-shi, Kanagawa (JP)

(72) Inventor: Masatoshi Takamiya, Numazu (JP)

(73) Assignee: FUJITSU LIMITED, Kawasaki (JP)

( * ) Notice: Subject to any disclaimer, the term of this patent is extended or adjusted under 35 U.S.C. 154(b) by 77 days.

(21) Appl. No.: 15/083,414

(22) Filed: Mar. 29, 2016

(65) Prior Publication Data

US 2016/0321130 A1    Nov. 3, 2016

(30) Foreign Application Priority Data

May 1, 2015 (JP) ................................. 2015-093791

(51) Int. Cl.
    *G06F 11/07*      (2006.01)
    *G06F 12/02*      (2006.01)

(52) U.S. Cl.
CPC ........ *G06F 11/0778* (2013.01); *G06F 11/073* (2013.01); *G06F 12/0253* (2013.01); *G06F 11/079* (2013.01); *G06F 11/0751* (2013.01)

(58) Field of Classification Search
CPC ............. G06F 11/0778; G06F 11/3466; G06F 11/3636; G06F 11/079; G06F 11/0751
See application file for complete search history.

(56) References Cited

U.S. PATENT DOCUMENTS

| | | | | |
|---|---|---|---|---|
| 7,222,133 B1 * | 5/2007 | Raipurkar | ........... | G06F 11/1458 707/642 |
| 7,685,575 B1 * | 3/2010 | Fareed | ................ | G06F 11/0715 714/37 |
| 7,953,772 B2 * | 5/2011 | Simeonov | ........... | G06F 11/0709 707/813 |
| 7,979,748 B2 | 7/2011 | Brady | | |
| 2005/0240641 A1 | 10/2005 | Kimura et al. | | |
| 2008/0127212 A1 | 5/2008 | Nakamizo et al. | | |
| 2009/0327373 A1 * | 12/2009 | Chacko | ................ | G06F 11/3612 |
| 2012/0151278 A1 * | 6/2012 | Tsantilis | ................ | G06F 11/366 714/48 |

FOREIGN PATENT DOCUMENTS

| | | |
|---|---|---|
| JP | 10-333938 | 12/1998 |
| JP | 2008-134709 | 6/2008 |
| JP | 2009-151680 | 7/2009 |
| WO | 2004/099985 A1 | 11/2004 |

* cited by examiner

*Primary Examiner* — Joseph O Schell
(74) *Attorney, Agent, or Firm* — Staas & Halsey LLP

(57) ABSTRACT

An apparatus includes a memory to store objects of a plurality of classes, and a storage device to store plural pieces of dump data acquired at different times from the memory. The apparatus generates object-count information indicating a number of objects belonging to each of a plurality of classes, based on the plural pieces of dump data acquired at different times from a memory storing objects of the plurality of classes. The apparatus determines, for each class, at least a portion of dump data that includes a locally minimum number of objects in time variation of the number of objects of the each class, as first dump data that is candidate for storage, based on the generated object-count information. When reducing a total amount of dump data, the apparatus excludes the first dump data determined for each class from second dump data that is to be deleted.

7 Claims, 21 Drawing Sheets

| num | #instances | #bytes | class name |
|---|---|---|---|
| 1: | 10045 | 1038864 | <constMethodKlass> |
| 2: | 10045 | 968336 | <methodKlass> |
| 3: | 747 | 450552 | <constantPoolKlass> |
| 4: | 3676 | 302576 | [C |
| 5: | 747 | 292664 | <instanceKlassKlass> |
| 6: | 704 | 275120 | <constantPoolCacheKlass> |
| 7: | 880 | 159384 | [B |
| 8: | 842 | 103192 | java.lang.Class |

...

| Total | 39944 | 4100824 | |

FIG. 17

102 MEMORY

31

| CLASS ID | CLASS NAME |
|---|---|
| 1 | java.lang.String |
| 2 | java.lang.Class |
| 3 | java.util.Hashtable$Entry |
| ⋮ | ⋮ |

32

| TOTAL OF $x_i$ | TOTAL OF $x_i^2$ | NUMBER OF COLLECTED MATERIALS |
|---|---|---|
|  |  |  |

33

| CLASS ID | TOTAL OF $y_{ki}$ | TOTAL OF $x_i y_{ki}$ | INCLINATION |
|---|---|---|---|
| 1 |  |  |  |
| 2 |  |  |  |
| 3 |  |  |  |
| ⋮ | ⋮ | ⋮ | ⋮ |

APPARATUS AND METHOD FOR MANAGING DUMP DATA FOR CAUSE ANALYSIS OF A MEMORY LEAK

CROSS-REFERENCE TO RELATED APPLICATION

This application is based upon and claims the benefit of priority of the prior Japanese Patent Application No. 2015-093791, filed on May 1, 2015, the entire contents of which are incorporated herein by reference.

FIELD

The embodiments discussed herein are related to apparatus and method for managing damp data for cause analysis of a memory leak.

BACKGROUND

In a computer system which operates in multi-process, programs are prepared such that upon completion of a process, the storage area of the memory used in the process is released. However, due to a defect or the like in the program, the storage area used in the process may not be released even after the process has ended. A state where a storage area of the memory remains secured is called the memory leak. The memory leak causes abnormal termination or slowdown of the system.

For example, as a function of releasing an unused memory area, there is garbage collection (GC). In the GC, releasing a memory area in which unnecessary data is stored is called recovery of data. The memory leak occurs even in a system where GC is implemented. For example, when the GC is unable to recover unnecessary data due to reference to unnecessary data (object) from a program, the memory leak occurs. Since mechanically correct determination of unnecessary data is difficult, it is impossible to completely suppress the memory leak.

Since it is difficult to mechanically determine whether data is an unnecessary object, a material such as dump data or class histogram by heap dump (snapshot dump of data in the memory) is collected in the practical memory leak investigation. The class histogram is a graphed transition of the number of objects for each class in the object-oriented programming. Occurrence of the memory leak is determined by manually analyzing the collected material.

In the memory leak investigation, it is difficult to determine an appropriate material collection timing before collecting. For this reason, it is preferable to collect materials at as many timing as possible. However, as memory capacity becomes larger, data amount of dump data is increasing. Therefore, if dump data is collected frequently and all collected dump data is stored, storage capacity of the storage device becomes tight. Then, for example, when total amount of dump data reaches a predetermined value, dump data is deleted in order from data of older collection time.

Related techniques are disclosed in, for example, International Publication Pamphlet No. WO 2004/099985, U.S. Pat. Nos. 7,979,748 and 7,953,772, and Japanese Laid-open Patent Publication Nos. 10-333938 and 2009-151680.

SUMMARY

According to an aspect of the invention, an apparatus includes a memory to store objects of a plurality of classes, and a storage device to store plural pieces of dump data acquired at different times from the memory. The apparatus generates object-count information indicating a number of objects belonging to each of a plurality of classes, based on the plural pieces of dump data acquired at different times from a memory storing objects of the plurality of classes. The apparatus determines, for each class, at least a portion of dump data that includes a locally minimum number of objects in time variation of the number of objects of the each class, as first dump data that is candidate for storage, based on the generated object-count information. When reducing a total amount of dump data, the apparatus excludes the first dump data determined for each class from second dump data that is to be deleted.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 6 is a diagram illustrating an example of a histogram file, according to an embodiment;

FIG. 17 is a diagram illustrating an example of data within a storage area used for leak class identification processing, according to an embodiment;

DESCRIPTION OF EMBODIMENTS

Conventionally, when deleting a portion of a large amount of dump data repeatedly collected by heap dump or the like to suppress the tightening of the storage capacity of the storage device, consideration is not taken as to which material is useful for cause analysis of the memory leak. Thus, there is a possibility that dump data useful for cause analysis of the memory leak is deleted. If dump data useful for cause analysis of the memory leak is deleted, cause analysis becomes difficult.

According to an aspect, it is an object to avoid deletion of dump data useful for cause analysis of the memory leak.

Hereinafter, embodiments are described with reference to the accompanying drawings. Each embodiment may be implemented in combination with a plurality of embodiments within a consistent scope.

First Embodiment

Hereinafter, a first embodiment is described. The first embodiment is intended to avoid deletion of dump data useful for cause analysis of the memory leak when deleting a portion of dump data to reduce total data amount of the dump data for cause analysis of the memory leak.

Figure 1:
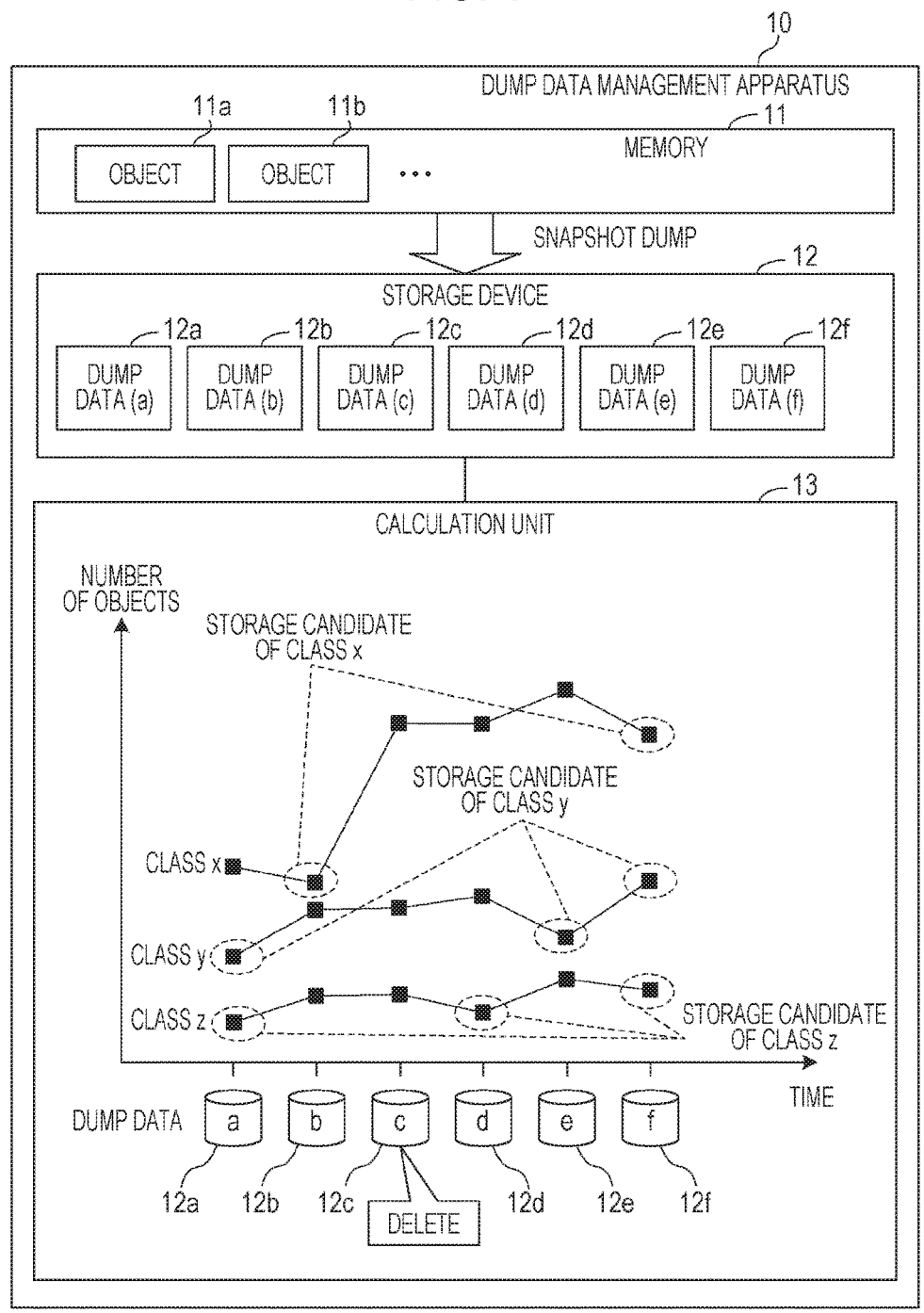
FIG. 1 is a diagram illustrating an example of a dump data management apparatus, according to an embodiment.

FIG. 1 illustrates an example of a dump data management apparatus according to a first embodiment. A dump data management apparatus 10 includes a memory 11, a storage device 12, and a processor 13. The memory 11 stores a plurality of class objects 11a, 11b, . . . .

The storage device 12 stores plural pieces of dump data 12a to 12f acquired from the memory 11 at different times. For example, dump data collected from the memory 11 by periodical snapshot dump is stored in the storage device 12.

The processor 13 is, for example, a processor of the dump data management apparatus 10. The processor 13 manages the plural pieces of dump data 12a to 12f. For example, the processor 13 performs dump data total amount reduction processing when total data amount of the plural pieces of dump data 12a to 12f exceeds a predetermined threshold value.

When reducing the total amount of dump data, the processor 13 first generates information indicating the number of objects belonging to each of a plurality of classes, based on the plural pieces of dump data 12a to 12f. For example, a histogram of the number of objects is generated for each of the pieces of dump data 12a to 12f.

Next, the processor 13 determines, as storage candidate dump data, at least a portion of dump data having a locally minimum number of objects in time variation of the number of objects for each class, based on the generated information indicating the number of objects. Dump data having a locally minimum number of objects is dump data having the number of objects smaller than dump data collected just before and smaller than dump data collected just thereafter. For example, the processor 13 takes each of the plural pieces of dump data 12a to 12f as a determination target. Then, the processor 13 determines whether the number of objects of the class in the dump data of the determination target is smaller than the number of objects of the class of each of other dump data collected after the dump data of the determination target. When the number of objects of the dump data of the determination target is smaller, the processor 13 selects the dump data of the determination target as storage candidate dump data.

Further, the processor 13 excludes storage candidate dump data determined for each class from deletion target dump data when reducing the total amount of dump data. Then, when the total amount of dump data exceeds a predetermined threshold value, the processor 13 deletes dump data other than the storage candidate until the total amount of dump data becomes equal to or smaller than the threshold value.

The processor 13 may select, out of a plurality of classes, a class which is most likely to be a cause of the memory leak, and determine storage candidate dump data, based on the time transition of the number of objects of the selected class. For example, the processor 13 may select, out of a plurality of classes, two or more classes having high tendency of increasing the number of objects belonging thereto, and determine storage candidate dump data for the selected classes.

The processor 13 may select lastly collected dump data as storage candidate dump data. Further, when the total amount of dump data exceeds the threshold value even after all dump data other than storage candidate dump data has been deleted, the processor 13 identifies, for each class, dump data having the smallest number of objects of the class, out of storage candidate dump data. Then, the processor 13 sets storage candidate dump data other than identified dump data and lastly collected dump data, as deletion target dump data when reducing the total amount of dump data.

Figure 2:
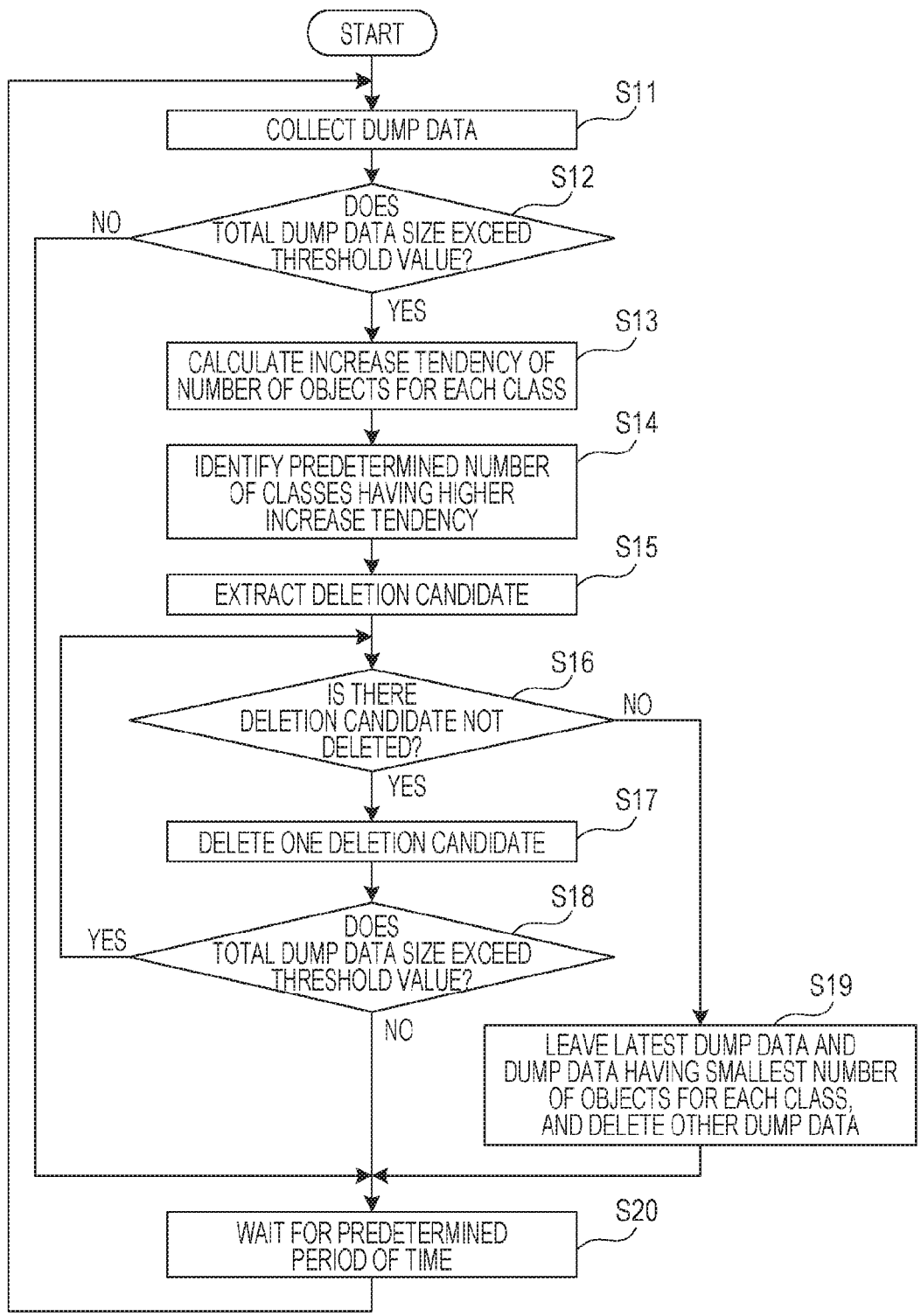
FIG. 2 is a diagram illustrating an example of an operational flowchart for dump data management processing, according to an embodiment.

FIG. 2 is an operational flowchart illustrating an example of a procedure of the dump data management processing.

[Step S11] The processor 13 collects dump data from the memory 11. The processor 13 assigns the time of collection (time stamp) to the collected dump data and stores the collected dump data into the storage device 12.

[Step S12] The processor 13 determines whether total data size of the dump data stored in the storage device 12 exceeds the threshold value. When the total data size exceeds the threshold value, processing is proceeded to the step S13. When the total data size does not exceed the threshold value, processing is proceeded to the step S20.

[Step S13] The processor 13 calculates increase tendency of the number of objects for each class. The increase tendency of the number of objects is represented, for example, by inclination of an approximate straight line indicating time transition of the number of objects.

[Step S14] The processor 13 identifies a predetermined number of classes in order from a class having higher increase tendency of the number of objects.

[Step S15] The processor 13 extracts deletion candidate dump data. For example, in transition of the number of objects belonging to the class, the processor 13 excludes dump data having a locally minimum number of objects and latest dump data from the deletion candidate. Then, the processor 13 extracts dump data not excluded from the deletion candidates in any class, as the deletion candidate.

[Step S16] The processor 13 determines whether there is deletion candidate dump data not deleted. When all deletion candidate dump data has been deleted, processing is proceeded to the step S19. When there is deletion candidate dump data not deleted, processing is proceeded to the step S17.

[Step S17] The processor 13 deletes one of deletion candidate dump data from the storage device 12.

[Step S18] The processor 13 determines whether total data size of the dump data stored in the storage device 12 still exceeds the threshold value. When the total data size exceeds the threshold value, processing is proceeded to the step S16. When the total data size does not exceed the threshold value, processing is proceeded to the step S20.

[Step S19] The processor 13 leaves behind latest dump data and dump data having the number of objects which is a minimum in any one of the identified classes and deletes other dump data from the storage device 12.

[Step S20] The processor 13 waits for a predetermined period of time and then proceeds processing to the step S11.

Thus, when deleting dump data to reduce total data amount of the dump data, deletion of dump data useful for cause analysis of the memory leak may be avoided. Also, when total data size of dump data is equal to or smaller than the threshold value, deletion of the dump data is stopped.

For example, in the example of FIG. 1, storage candidates of the class x are the latest pieces of dump data 12f and dump data 12b having a minimum number of objects. For the class y, the latest pieces of dump data 12f and dump data 12a, 12e having a minimum number of objects are storage candidates. For the class z, the latest pieces of dump data 12f and dump data 12a, 12d having a minimum number of objects are storage candidates. Dump data determined as the storage candidate is deleted from the deletion target. As a result, only the dump data 12c becomes the deletion target. Then, the dump data 12c is deleted from the storage device 12.

When objects have been recovered from dump data by GC, a locally minimum number of objects are included in the dump data. Therefore, deletion of dump data from which objects have been recovered by GC may be avoided by excluding dump data including a locally minimum number of objects from the deletion candidates. Dump data from which objects have been recovered by GC includes objects remaining due to failure of collection, but does not include objects which have been recovered by GC. Such dump data is useful for cause analysis of the memory leak which occurs due to failure of object recovery. Therefore, deletion of dump data useful for cause analysis of the memory leak may be avoided by deleting dump data in the processing illustrated in FIG. 2.

Only a portion of dump data having a locally minimum number of objects may be left behind as a storage candidate. For example, even dump data having a locally minimum number of objects in a certain class may be selected as a deletion target without leaving behind as a storage candidate when the number of objects thereof is larger than the number of objects of dump data collected thereafter. When the number of objects of dump data is smaller than the number of objects of dump data collected previously, the dump data collected previously includes an object which is recovered by GC thereafter. For this reason, it is efficient in the cause analysis of the memory leak to analyze dump data which is collected later and therefore has a less number of objects. Therefore, even with dump data having a locally minimum number of objects in a certain class, efficient cause analysis with effective utilization of the storage device 12 becomes possible by selecting the dump data as a deletion target when the number of objects thereof is larger than dump data collected thereafter.

Latest dump data is kept as a storage candidate without deleting, and thereby deletion of information related to an object which has been generated recently and become unrecoverable may be avoided.

Further, when dump data having a locally minimum number of objects is selected as a storage candidate for each of a plurality of classes, total data amount of dump data may exceed the threshold value even after all deletable dump data is deleted. In this case, sufficient amount of dump data may be deleted by selecting, for each class, dump data having the smallest number of objects and latest dump data as the storage candidate. Also, by keeping dump data having the smallest number of objects, information of an object which is unrecoverable at that timing may be acquired from the dump data. Also, by keeping latest dump data, information of an object which is generated after acquisition of dump data having the smallest number of objects and is not recovered may be collected from latest dump data. Therefore, cause analysis of the memory leak is possible with the remaining dump data.

Further, overlooking of a class being the cause of the memory leak may be avoided by determining storage candidate dump data out of two or more classes having higher increase tendency of the number of objects. That is, when the storage candidate dump data is determined based on increase or decrease of the number of objects of one class having high increase tendency, the cause analysis becomes difficult when the memory leak occurs due to an object of the other class. When dump data to be stored is determined based on increase or decrease of the number of objects of each of a plurality of classes having high increase tendency, there is less possibility that a class not being the determination target is the cause of the memory leak. As a result, deletion of dump data useful for the cause analysis of the memory leak may be avoided.

Second Embodiment

Next, a second embodiment is described. In the second embodiment, "material" includes a dump file holding the content of individual objects and references like heap dump and a file including class histogram information. In the second embodiment, a material not useful for memory leak investigation may be automatically deleted from a plurality of materials. This reduces the amount of disk area used for a collected material and time for manual selection of the material.

That is, continuous collection and storage of a large amount of materials causes storage capacity of the storage device to be tight. For example, to identify an object causing the memory leak, it is general to analyze a dump file holding a reference relation between objects. However, in many cases, the size of one dump file is larger than the amount of memory used by the execution environment. For this reason, periodical storage consumes a large amount of storage capacity of the storage device. This may result in affecting the operation environment due to shortage of the memory area and so on.

All of collected materials are not necessarily useful for memory leak investigation. Thus, consumption of the storage capacity to be used may be suppressed by deleting unnecessary materials. For automatic deletion of the collected material, it is important to appropriately determine usefulness of the material for the cause analysis of the memory leak.

For example, there is the log rotation as a method for automatically deleting the log. The log rotation is a method for deleting the log in order from older data. Automatic deletion of the material by using the log rotation may delete a material useful for the cause analysis of the memory leak. For example, assume that an object (leak object) becoming a cause generating the memory leak is generated at an early stage after start of a system operation and materials have been continuously collected for a long period of time thereafter. In this case, if the material is deleted in order from an older material, there is a possibility that a material having nothing with the memory leak is left behind, and a material related to the leak object is deleted. Therefore, in the second embodiment, when automatically deleting a memory leak investigation material, the material is determined whether it is useful for the cause analysis of the memory leak, and when determined to be useful, the material is excluded from the deletion target.

Figure 3:
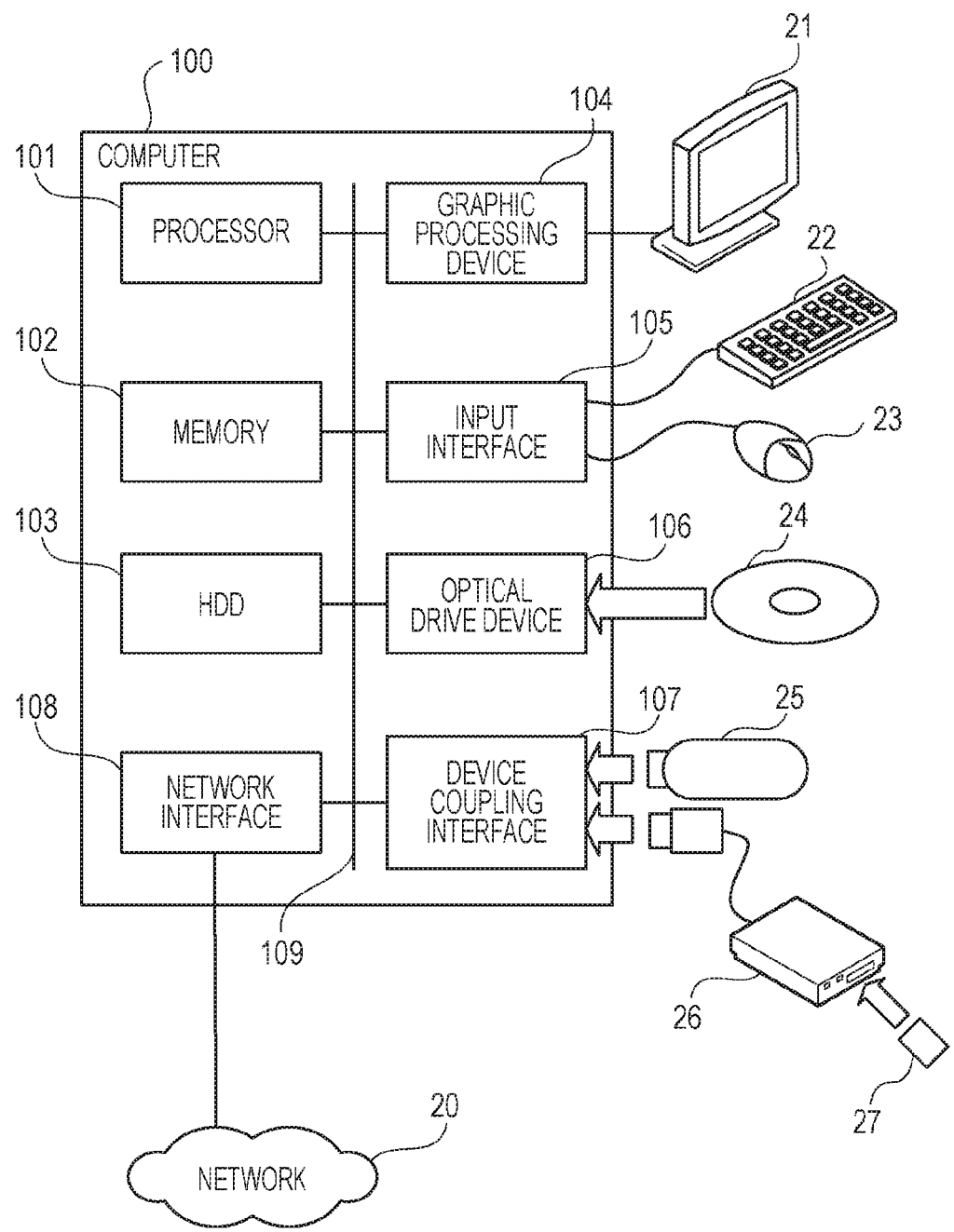
FIG. 3 is a diagram illustrating an example of a hardware configuration of a computer, according to an embodiment.

FIG. 3 illustrates a hardware configuration example of a computer used in the second embodiment. A computer 100 as a whole is controlled by a processor 101. The processor 101 is coupled with a memory 102 and a plurality of peripheral equipment via a bus 109. The processor 101 may be a multiprocessor. The processor 101 is, for example, a CPU, a micro processing unit (MPU), or a digital signal processor (DSP). At least a portion of functions implemented when the processor 101 executes a program may be implemented by an electronic circuit such as an application specific integrated circuit (ASIC) and a programmable logic device (PLD).

The memory 102 is used as a main storage device of the computer 100. The memory 102 temporarily stores at least a portion of programs of operating system (OS) executed by the processor 101 and an application program. Further, the memory 102 stores various data used for processing by the processor 101. As the memory 102, a volatile semiconductor storage device, such as a random access memory (RAM), is used.

Peripheral devices coupled to a bus 109 include a hard disk drive (HDD) 103, a graphic processing device 104, an input interface 105, an optical drive device 106, a device coupling interface 107, and a network interface 108.

The HDD 103 magnetically writes and reads data from an incorporated disk. The HDD 103 is used as an auxiliary storage device of the computer 100. The HDD 103 stores an OS program, an application program, various data and dump data. The auxiliary storage device may include a nonvolatile semiconductor storage device (SSD: Solid State Drive) such as a flash memory.

The graphic processing device 104 is coupled to a monitor 21. The graphic processing device 104 displays an image on a screen of the monitor 21 in accordance with an instruction from the processor 101. The monitor 21 includes a display device and a liquid display device using a cathode ray tube (CRT).

The input interface 105 is connected to a keyboard 22 and a mouse 23. The input interface 105 transmits signals sent from the keyboard 22 and the mouse 23 to the processor 101. The mouse 23 is an example of pointing devices. Thus, another pointing device may be used. Other pointing devices include a touch panel, a tablet, a touch pad, a truck ball, and so on.

The optical drive device 106 reads data stored in an optical disk 24 by utilizing laser beam. The optical disk 24 is a portable recording medium in which data is recorded in such a manner allowing readout by light reflection. The optical disk 24 includes a digital versatile disc (DVD), a DVD-RAM, a compact disc read only memory (CD-ROM), and CD-R (Recordable)/RW (Rewritable).

The device coupling interface 107 is a communication interface for connecting peripheral devices to the computer 100. For example, the device coupling interface 107 may be coupled to a memory device 25 and a memory reader writer 26. The memory device 25 is a recording medium having a function for communication with the device coupling interface 107. The memory reader writer 26 is a device configured to write data into a memory card 27 or read data from the memory card 27. The memory card 27 is a card type recording medium.

A network interface 108 is connected to a network 20. The network interface 108 transmits and receives data from other computers or communication devices via the network 20.

With such a configuration, the processing function of the second embodiment may be implemented. The dump data management apparatus 10 according to the first embodiment also may be implemented by hardware similar with the computer 100 illustrated in FIG. 3. For example, the processor 101 illustrated in FIG. 3 is an example of the processor 13 illustrated in FIG. 1. The HDD 103 illustrated in FIG. 3 is an example of the storage device 12 illustrated in FIG. 1. The memory 102 illustrated in FIG. 3 corresponds to the memory 11 of FIG. 1.

The computer 100 implements the processing function of the second embodiment by executing, for example, a program recorded in a computer readable recording medium. A program describing details of processing to be executed by the computer 100 may be stored in various recording media. For example, a program to be executed by the computer 100 may be stored in the HDD 103. The processor 101 implements a program by loading at least a portion of a program in the HDD 103 into the memory 102. A program to be executed by the computer 100 may be stored in a portable recording medium, such as the optical disk 24, the memory device 25, and the memory card 27. A program stored in a portable recording medium becomes ready to run, for example, after being installed on the HDD 103, for example, by control through the processor 101. Alternatively, the processor 101 may run the program by directly reading from a portable recording medium.

During execution of such a program by the computer 100, dump file is generated at regular intervals by heap dump. Although the dump file is used for checking the memory leak, continuous keeping of all dump files causes storage area of the HDD 103 to be tight. Thus, the computer 100 deletes unnecessary dump files as appropriate.

Figure 4:
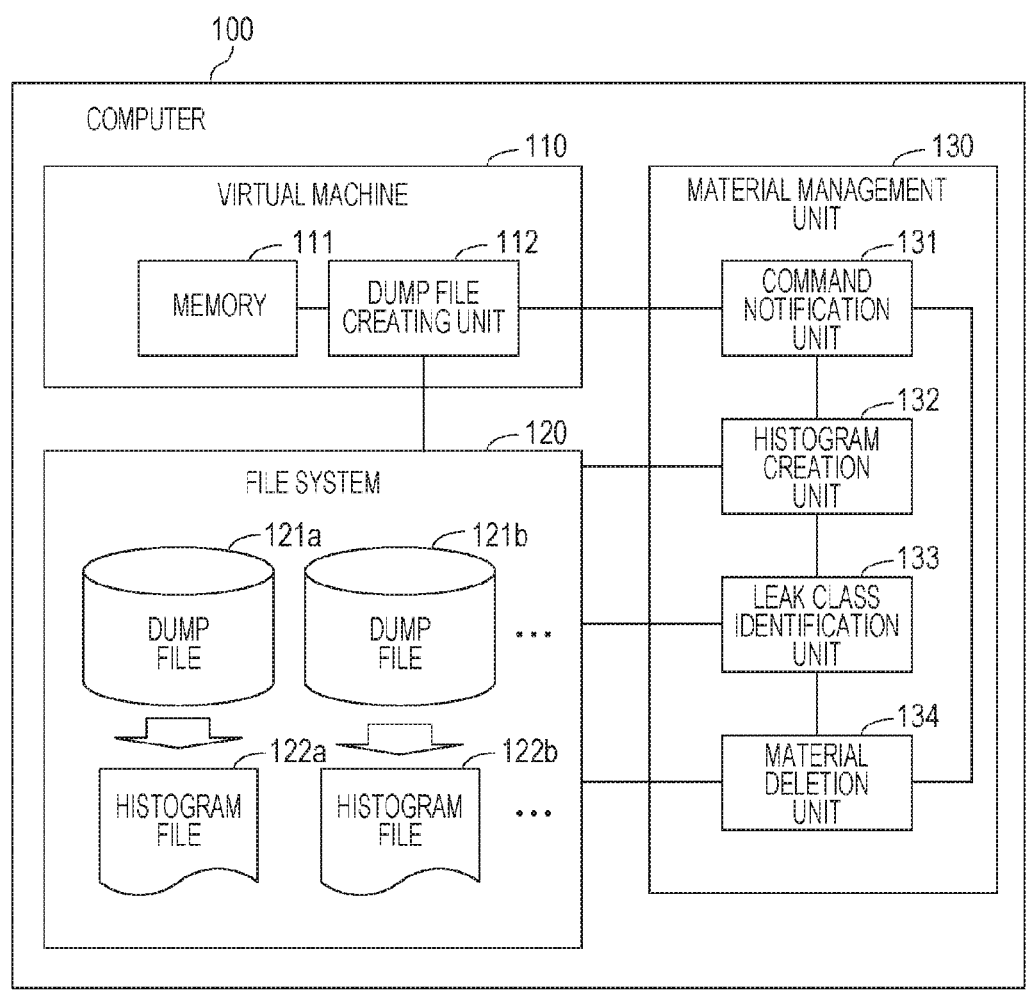
FIG. 4 is a block diagram illustrating an example of a dump file management function in a computer, according to an embodiment.

FIG. 4 is a block diagram illustrating a dump file management function in the computer. The computer 100 includes a virtual machine 110, a file system 120, and a material management unit 130.

The virtual machine 110 includes a memory 111 and a dump file creating unit 112. The memory 111 is virtually implemented in the virtual machine 110. Upon receiving a material collection command from the material management unit 130, the dump file creating unit 112 performs heap dump and stores dump file into the file system 120.

The file system 120 manages files within the computer 100. The file system 120 manages a plurality of dump files 121a, 121b, . . . and histogram files 122a, 122b, . . . respectively corresponding to a plurality of dump files 121a, 121b, . . . . A plurality of dump files 121a, 121b, . . . and histogram files 122a, 122b, . . . are stored by the file system, for example, into the HDD 103.

The material management unit 130 includes a command notification unit 131, a histogram creation unit 132, a leak class identification unit 133, and a material deletion unit 134.

The command notification unit 131 transmits the material collection command to the virtual machine 110 at predetermined intervals.

The histogram creation unit 132 creates a class histogram of dump files 121a, 121b, . . . managed by the file system 120. The histogram creation unit 132 stores histogram files 122a, 122b, . . . including created class histograms into the HDD 103 via the file system 120.

The leak class identification unit 133 identifies the class (leak class) in which leak may have occurred. For example, the leak class identification unit 133 first calculates object increase tendency for each of classes. Then, the leak class identification unit 133 identifies, for example, a predetermined number of classes having higher object increase tendency as the leak class.

The material deletion unit 134 determines materials (a pair of the dump file and the histogram file) to be deleted with reference to the object increase tendency for each class. Then, the material deletion unit 134 deletes a material decided to delete, from the file system 120.

Lines coupling elements with each other as illustrated in FIG. 4 indicate a portion of communication paths, and a communication path other than the illustrated communication paths may be set. Functions of each of elements illustrated in FIG. 4 may be implemented by causing a computer to run a program module corresponding thereto.

Figure 5:
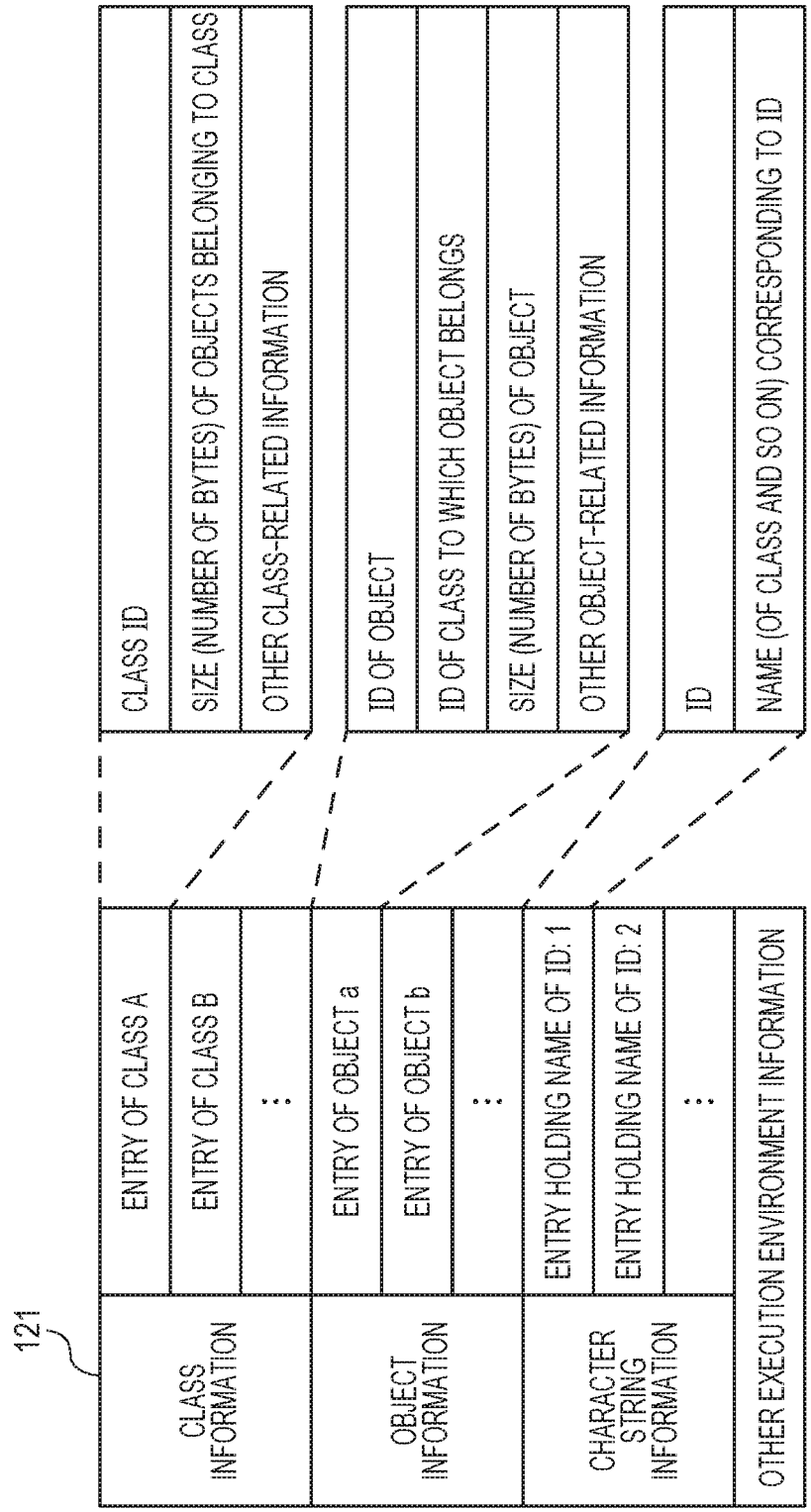
FIG. 5 is a diagram illustrating an example of a data structure of a dump file, according to an embodiment.

FIG. 5 illustrates a data structure example of the dump file. The dump file 121 includes class information, object information, character string information, and other execution environment information.

Class information includes entries of all classes that exist in the execution environment of the virtual machine 110 when executing the heap dump. Entries of each class include, for example, the class ID, the size (number of bytes) of objects belonging to the class, and other information related to the class. The class ID is identification information for uniquely identifying each class. The size (number of bytes) of the objects belonging to the class is the sum of memory capacity occupied by each of the objects belonging to the corresponding class.

Object information includes entries of all objects that exist in the execution environment of the virtual machine 110 when executing the heap dump. Entries of each object include the object ID, the class ID to which the object belongs, the size (number of bytes) of the object, and other information related to the object. The object ID is identification information for uniquely identifying each object. An object and a class to which the object belongs are associated with each other by the ID of the class to which the object belongs. The size (number of bytes) of the object is memory capacity occupied by the corresponding object.

Character string information includes entries holding the class ID or object ID and name (class name or object name) corresponding to the ID for each class and object.

By analyzing such a dump file 121, name of the class and the number and size of objects of each of classes that exist in the execution environment when heap dump is collected may be obtained. Then, the class histogram may be created based on the information obtained from the dump file 121.

FIG. 6 illustrates an example of the histogram file. Information for each class is set in the histogram file 122. For example, information for each class is set in association with a serial number represented by [num]. In the column of [#instances], the number of objects of the corresponding class is set. In the column of [#bytes], storage capacity of the memory 111 occupied by the object of the corresponding class is set. In the column of [class name], name of the class is set.

The material management unit 130 determines usefulness of each material by analyzing a histogram obtained from each dump file. In determining usefulness of the material, information on increase and decrease of the number of objects may be used.

In determining usefulness of use, the leak class is identified based on the increase and decrease tendency of the number of objects included in the material. For example, a predetermined number of classes having higher increase tendency of the number of objects for each class is determined as the leak class.

Figure 7:
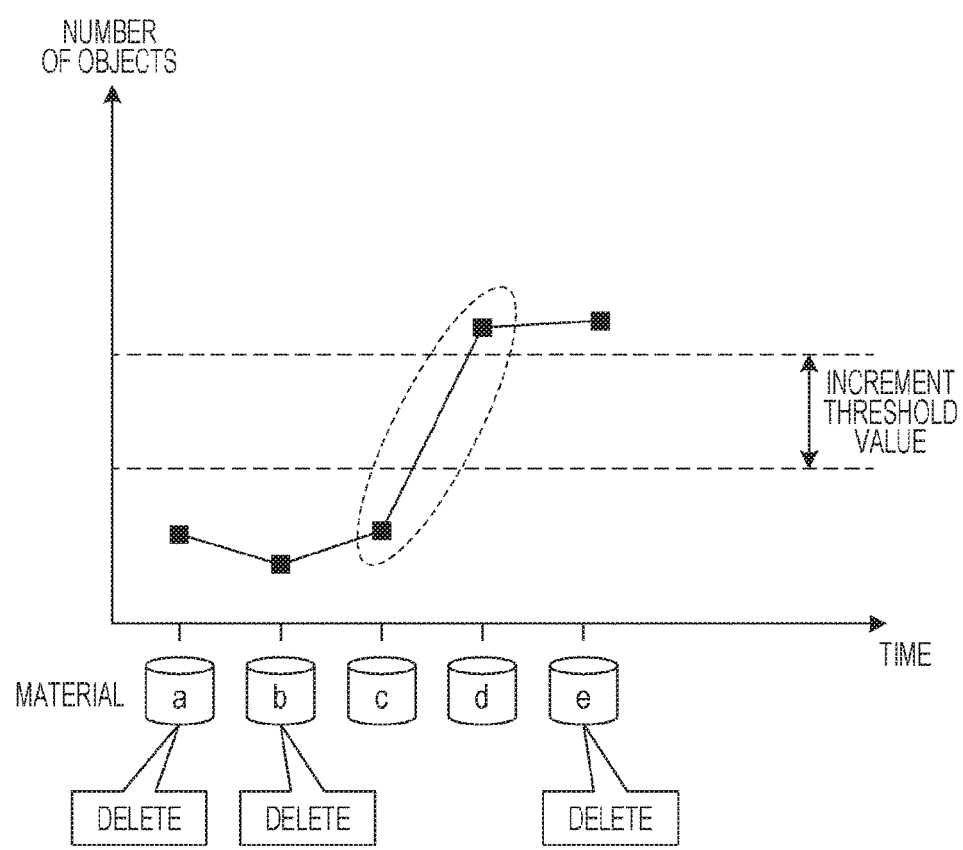
FIG. 7 is a diagram illustrating an example of leaving behind materials including objects just before and after increase in the number of objects of a leak class exceeds a threshold value, according to an embodiment.

As a method for deleting an unnecessary material, it may be considered, for example, to leave behind materials existing just before and after increase in the number of objects of the leak class exceeds the threshold value, and delete other materials. FIG. 7 illustrates an example of leaving behind materials before and after increase in the number of objects of the leak class exceeds the threshold value. In FIG. 7, the number of objects is equal to or exceeds the threshold value between materials "c" and "d" out of materials "a" to "e". Thus, the material "c" and the material "d" are left behind, and other materials "a", "b", and "e" are deleted.

This method is effective when not so many objects of the leak class are recovered. That is, it is considered that in a period when increase in the number of objects is equal to or greater than the threshold value, objects whose number is equal to or greater than the number estimated in normal processing are generated, and generation processing of the objects may be the cause of the memory leak. However, in this example, a material useful for the memory leak investigation may not be determined properly when generation and recovery of the object is repeated.

Figure 8:
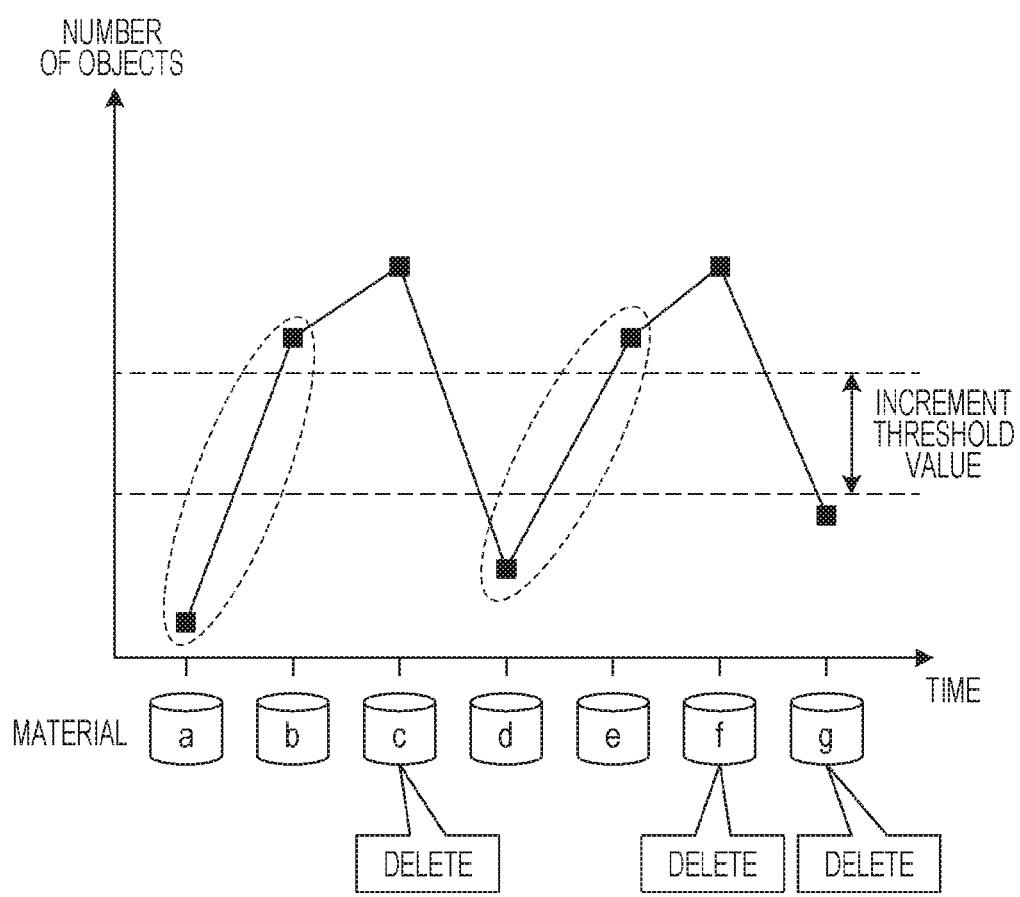
FIG. 8 is a diagram illustrating a problem with leaving behind materials including objects just before and after increase in the number of objects of a leak class exceeds a threshold value, according to an embodiment.

FIG. 8 illustrates a problem caused by leaving behind materials existing just before and after increase in the number of objects of the leak class exceeds the threshold value. In FIG. 8, for example, the number of objects increases in materials "b" and "c", but most of the increased objects has been recovered in the material "d". Likewise, the number of objects increases in materials "e" and "f", but most of the increased objects disappear in the material "g".

In the example of FIG. 8, when materials existing just before and after increase in the number of objects of the leak class exceeds the threshold value are left behind and other materials are deleted, materials "a", "b", "d", and "e" are left behind, and materials "c", "f", and "g" are deleted.

However, most of objects which are newly generated in materials "b" and "c" has been recovered at the time of the material "d". This means that objects generated after collection of the material "a" but before collection of the material "b" have been recovered and therefore are not the cause of the memory leak. Thus, not only the material "c" but also the material "b" has low usefulness in the cause analysis of the memory leak. Likewise, most of objects newly generated in materials "e" and "f" have been recovered at the time of the material "g" and therefore not only the material "f" but also the material "e" has low usefulness in the cause analysis of the memory leak. Nevertheless, disk capacity becomes tight unless materials "b" and "e" are deleted.

It is preferable to identify a plurality of classes as the leak class. This is because sure determination of the leak class is difficult. That is, even if an object suspected to have a leak exists in a identified leak class, whether the object is a leak object or not is dependent on the application design and is difficult to determine mechanically. If the leak class is limited to one class, there is a possibility that a useful material is deleted incorrectly.

Figure 9:
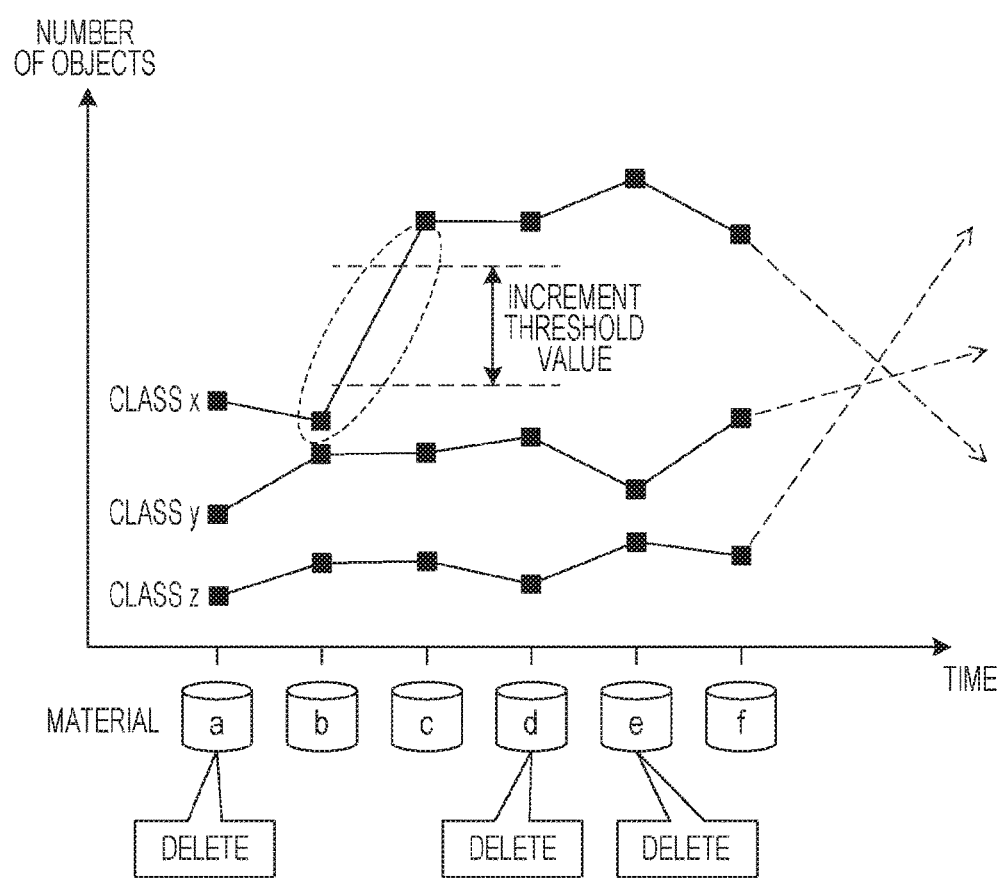
FIG. 9 is a diagram illustrating a problem when materials are deleted by identifying one class as a leak class, according to an embodiment.

FIG. 9 illustrates a problem when materials are deleted by determining one class as the leak class. FIG. 9 illustrates time variation in the number of objects of the class x, class y, and class z. In the example of FIG. 9, the class having a highest object increase tendency is the class x. When the class x is identified as the leak class, materials "b" and "c" existing just before and after the increase amount of the number of objects in the class x exceeds the threshold value are left behind, and other materials "a", "d", and "e" are deleted (in this example, the latest material "f" is left behind).

However, from a certain time, objects of the class x may be collected and thereafter the number of objects in the class x may decrease. In such a case, it is proved later that the class x is not the leak class. Then, the class y or the class z becomes the leak class. However, if the material has been deleted based on a change in the number of objects in the class x, a material useful for the cause analysis of the memory leak might have been deleted.

Like this case, if only a class temporarily having a highest object increase tendency is determined as the leak class and the material is deleted by neglecting other classes, a useful material might have been deleted consequently when the leak class is determined incorrectly. That is, it is difficult to uniquely identify the leak class without a mistake from the increase tendency of the number of objects, and there is a possibility that a useful material is deleted due to wrong determination of the leak class. In view of this, in the second embodiment, deletion of the useful material is avoided by determining a plurality of classes suspected to be a cause of the memory leak as a leak class.

As illustrated in FIGS. 8 and 9, a method of leaving behind materials existing just before and after the increase amount of objects of the leak class exceeds the threshold value fails to delete unnecessary materials appropriately when many objects of the leak class are generated and recovered. This is because only increase in the number of objects is considered, and whether or not the object has been recovered is not considered. In view of this, in the second embodiment, usefulness of the memory leak investigation material is determined by considering recovery of the object as well.

The computer 100 according to the second embodiment performs the following three major processes: The below processes are performed, for example, at a timing when the material is collected. 1) The virtual machine collects the dump file by heap dump. 2) The material management unit 130 analyzes increase and decrease tendency of the number of objects included in the dump file. For example, the material management unit 130 analyzes the number of objects of each class and determines a predetermined number of classes having higher increase tendency as the leak class. 3) The material management unit 130 analyzes increase and decrease tendency of the number of objects of the leak class, selects a material which is determined unnecessary based on the number of non-recovered objects thus obtained, as a deletion candidate, and determines a material which becomes a deletion candidate in all leak classes, as a material to be deleted. 4) When total data amount of materials still exceeds even after performing 2), the material management unit 130, for each of classes, leaves behind a latest material and a material having the smallest number of objects, and determines the other materials as deletion candidates. Then, the material management unit 130 determines a material that becomes a deletion candidate for all the classes, as a material to be deleted.

Thus, the material management unit 130 identifies a class suspected to be a cause of the leak in the above processes 1) and 2), and selects a material from which objects have been recovered as a deletion candidate in the above process 3).

Figure 10:
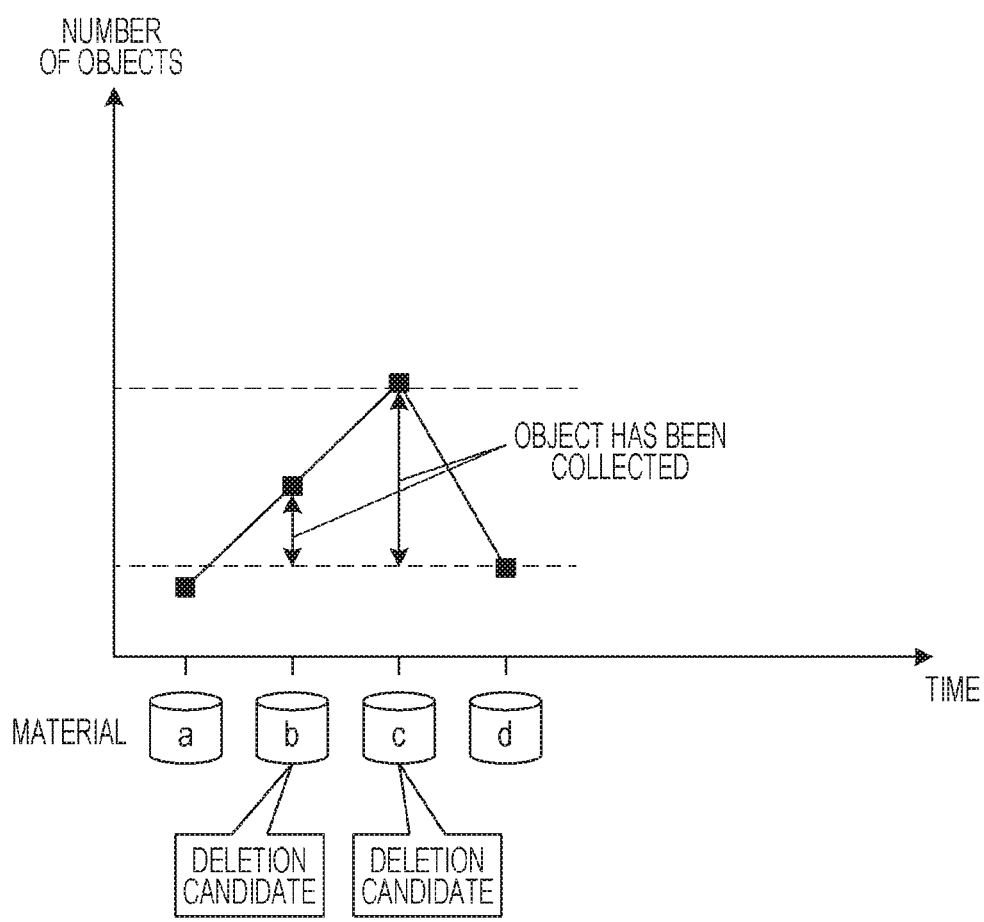
FIG. 10 is a diagram illustrating an example of determining material deletion considering recovery of an object, according to an embodiment.

FIG. 10 illustrates an example of determining the material deletion by considering recovery of the object; in the example of FIG. 10, the number of objects increases in materials "b" and "c", and decreases in the material "d". This indicates that most of objects included in materials "b" and "c" which have more objects than the material "d" have been recovered before collecting the material "d".

In the cause analysis of the memory leak, it is important to detect an object (leak object) which is not recoverable. The leak object is an object which is continuously referred to even after becoming unused and unnecessary, and which is not recovered by the GC. Thus, when the number of objects decreases, it may be said that at least a portion of objects has been recovered or there is no leak occurring in the recovered objects.

The example of FIG. 10 indicates that a portion of objects included in materials "b" and "c" has been recovered by the GC in the material "d", and the recovered objects are not the leak object. A leak object not recovered also resides in the material "d". Thus, materials "b" and "c" have low usefulness in the cause analysis of the memory leak. Then, the material management unit 130 selects materials "b" and "c" as the deletion candidate.

Figure 11:
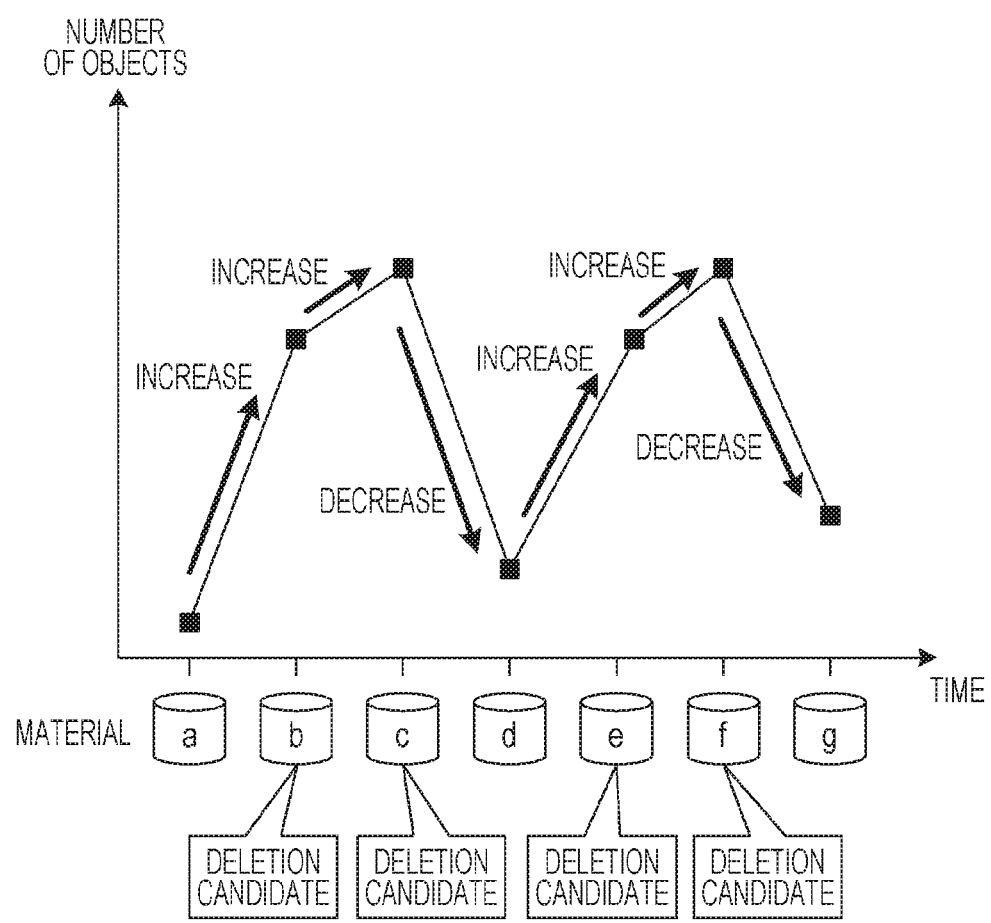
FIG. 11 is a diagram illustrating an example of determining material deletion when generation and recovery of an object is repeated, according to an embodiment.

FIG. 11 illustrates an example of determining the material deletion when generation and recovery of objects are repeated. When generation and recovery of objects are repeated, materials "d" and "g" after recovery of the objects are excluded from the deletion target. Also, the material "a" including the smallest number of objects is excluded from the deletion target. Materials "b", "c", "e", and "f" not excluded from the deletion target are selected as the deletion candidate.

In this case, even if all the deletable materials have been deleted, total data amount of materials may exceed the threshold value. For example, even if materials "b", "c", "e", and "f" of FIG. 11 are deleted, total data amount of materials may exceed the threshold value. In this case, the latest material and the material having the smallest number of objects are left behind, and other materials are selected as the deletion candidate.

Figure 12:
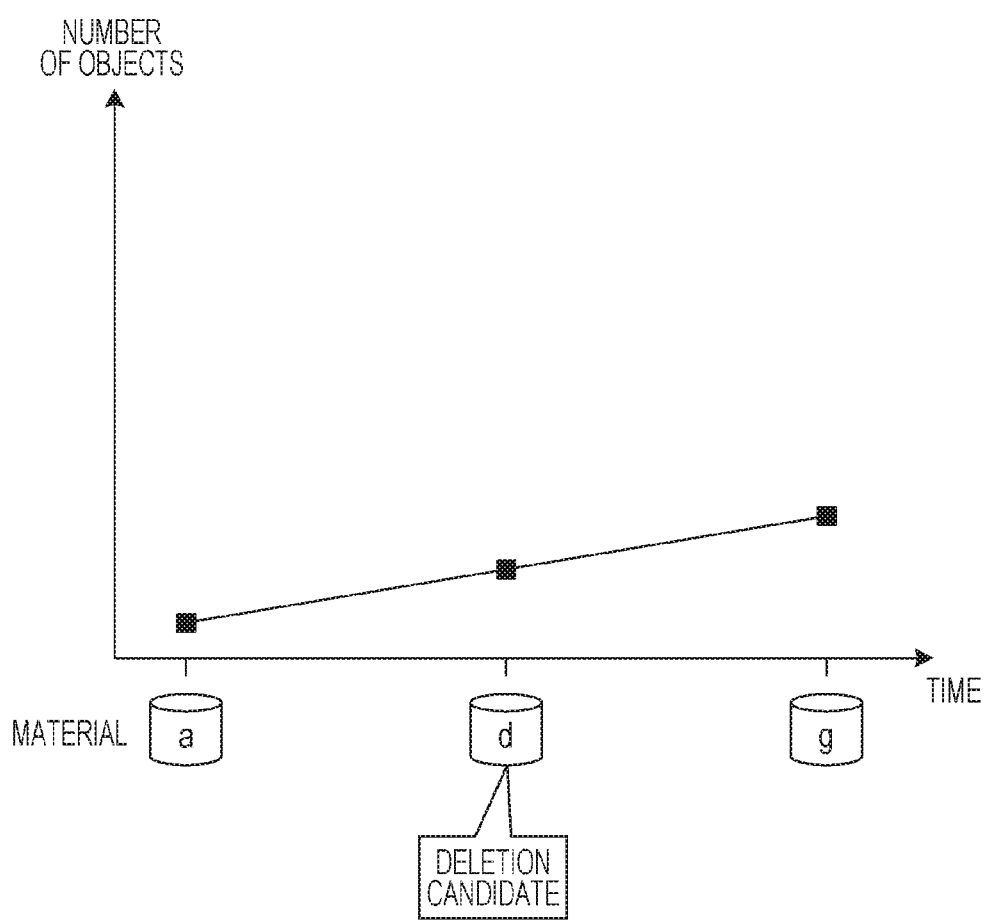
FIG. 12 is a diagram illustrating an example of leaving behind a latest material and a material including the smallest number of objects, according to an embodiment.

FIG. 12 illustrates an example of leaving behind the latest material and the material having the smallest number of objects. In the example of FIG. 12, the latest material "g" and the material "a" having the smallest number of objects are excluded from the deletion target, and the material "d" is selected as the deletion candidate.

Determination of the material as a deletion candidate is performed for each leak class. Only the material selected as the deletion candidate in all the leak classes becomes a final deletion candidate as a whole.

Figure 13:
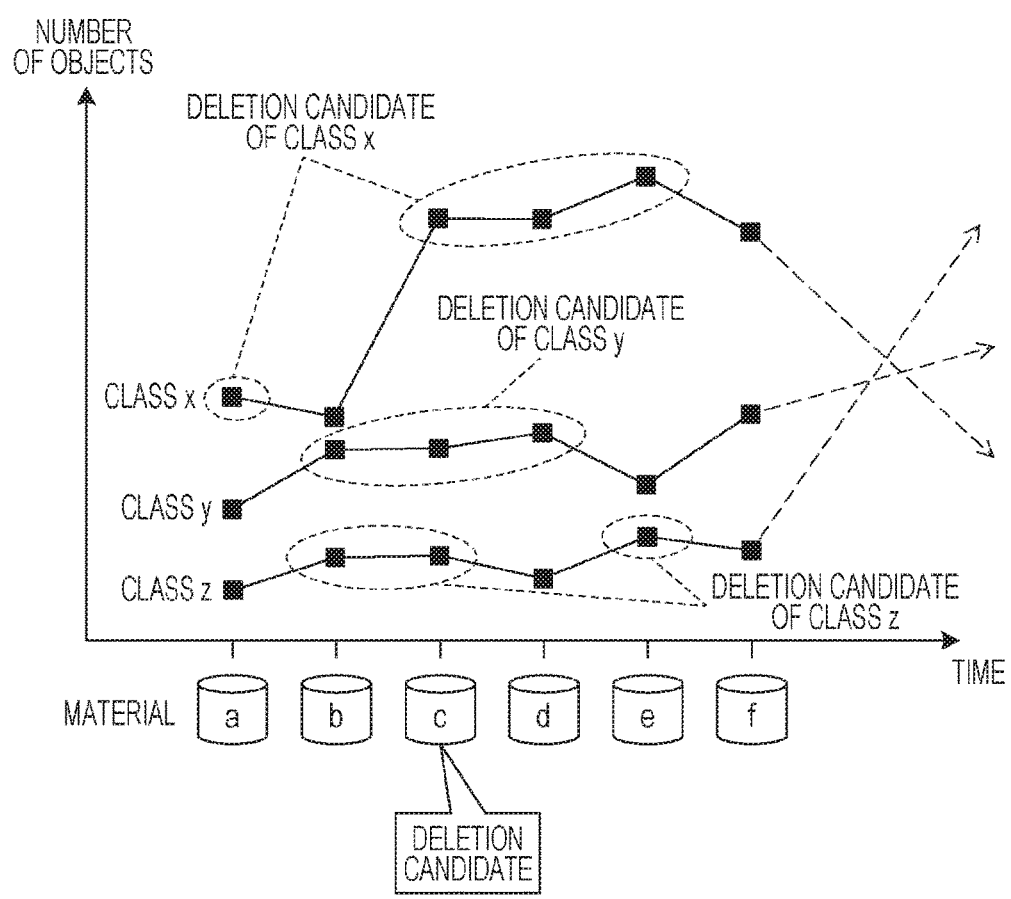
FIG. 13 is a diagram illustrating an example of deleting a material which is selected as a deletion candidate in a plurality of leak classes, according to an embodiment.

FIG. 13 illustrates an example of deleting a material which is selected as a deletion candidate in a plurality of leak classes. In the example of FIG. 13, only the material "c" is determined as a deletion candidate in all the classes. Therefore, the material "c" is deleted.

When total data amount of materials exceeds the threshold value even after the material "c" has been deleted, a material which is not the latest material and not a material having the smallest number of objects are selected as a deletion candidate. That is, when total data size of materials exceeds the threshold value even after all the materials selected as the deletion candidates have been deleted, the policy of leaving behind as many materials as possible is abandoned, and all the materials other than the minimum materials for identifying the leak object are deleted.

In the memory leak investigation, it is general to identify the leak object by comparing a material including many leak objects and a material including not so many objects with each other. For this reason, the latest material and the material having the smallest number of objects in a class suspected to have a leak are left behind. As a comparison target of the latest material, a material including a less number of objects in the leaked class presents a bigger difference in the number of objects from the latest material. Therefore, it facilitates the memory leak investigation. When there are plural materials having the smallest number of objects, for example, the latest material is left behind.

Figure 14:
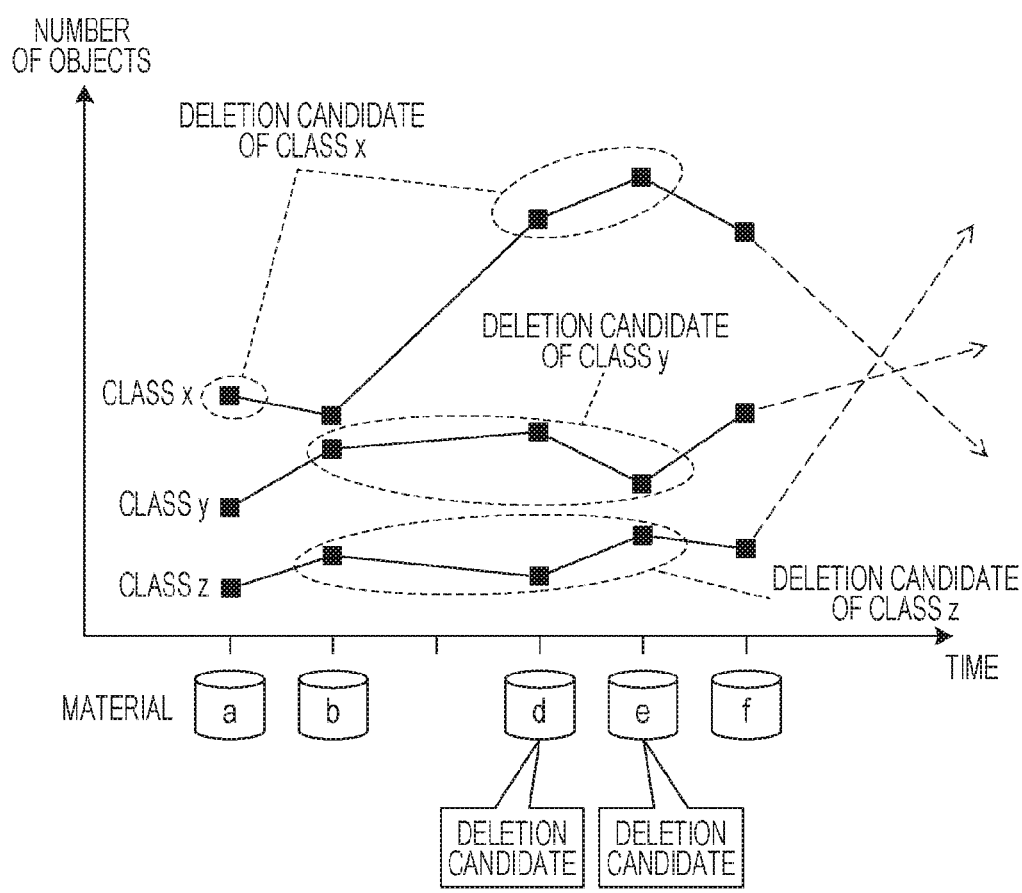
FIG. 14 is a diagram illustrating an example of deleting a material which is neither a latest material nor a material including the smallest number of objects in each class, according to an embodiment.

FIG. 14 illustrates an example of deleting a material which is neither the latest material nor a material including the smallest number of objects in each class. In the example of FIG. 14, the material "b" includes the smallest number of objects in the class x. Therefore, deletion candidates in the class x are materials "a", "d", and "f". In the class y, the material "a" includes the smallest number of objects. Therefore, deletion candidates in the class y are materials "b", "d", and "e". In the class z, the material "a" includes the smallest number of objects. Therefore, deletion candidates in the class z are materials "b", "d", and "e". Then, materials "d" and "e" selected as deletion candidates in each class are selected as final deletion candidates.

When there is no overlapping of materials including the smallest number of objects in each class, the number of materials left behind is "number of leak classes+1".

In the second embodiment, the deletion candidate material is deleted when total data amount of the materials exceeds a threshold value. The threshold value is a value enough to secure materials for the cause analysis of the memory leak.

Usefulness of materials may be determined in an appropriate manner by deleting a material after total data amount of the materials exceeds the threshold value. That is, when there is not so much information for determining the cause of the memory leak, for example, at a timing such as just after collection of the material, increase tendency of the number of objects may be determined based on a temporal increase or decrease in the number of objects. Meanwhile, when total size of the materials becomes so large to an extent exceeding a maximum value, it is possible to focus on a class that has the increase tendency of the number of objects in the long term.

Figure 15:
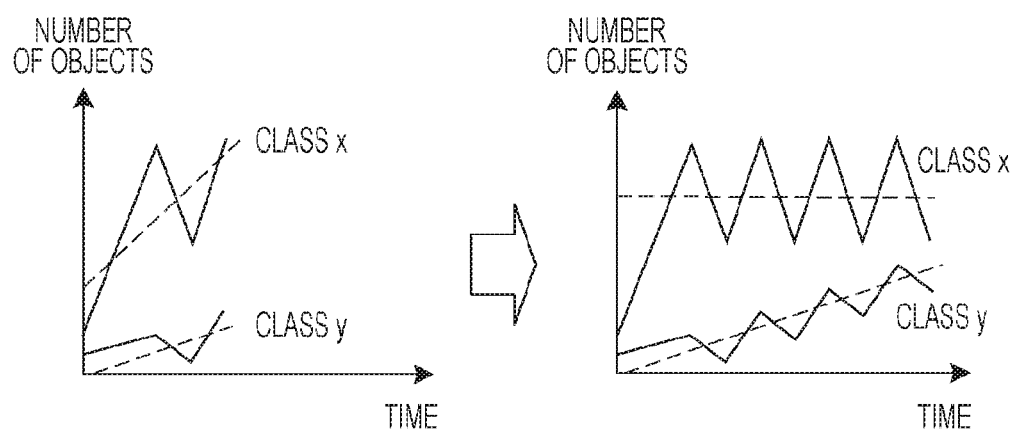
FIG. 15 is a diagram illustrating an example of discrepancy in a determination result of increase tendency of the number of objects due to a difference of a material collection period, according to an embodiment.

FIG. 15 illustrates an example of a discrepancy in the determination result of increase tendency of the number of objects due to a difference of the material collection period. In FIG. 15, the diagram on the left side indicates an example of determining the increase tendency of the number of objects when the material collection period is short, and the diagram on the right side indicates an example of determining increase tendency of the number of objects when the material collection period is long. When the material collection period is short, the class x has a higher increase degree than the class y. Thus, when the material collection period is short, the class x is determined to be the leak class. Meanwhile, when increase tendency of the number of objects is determined after collecting materials for a certain long period, the class x reaches a peak with a specific number of objects and thereafter has no increase tendency. Thus, there is a high possibility that the class x is not the leak class. On the other hand, the class y steadily increases the number of objects over a long period. Therefore, when the material collection period is long, it may be determined correctly that the class y is the leak class.

Next, procedure of material management processing by the material management unit 130 is described in detail. Assume that the following information has been preset to the material management unit 130. 1) maximum value (threshold value for material deletion) of total data amount (total material size) of storable material, 2) time interval (waiting time) of material collection, and 3) number (K) of classes to be focused.

Figure 16:
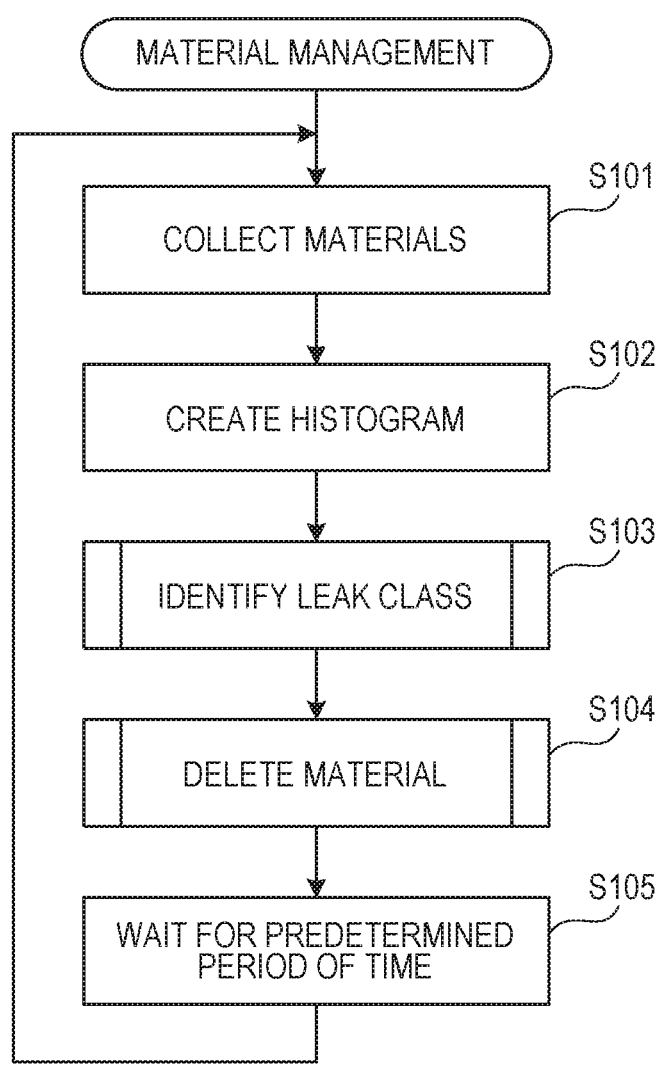
FIG. 16 is a diagram illustrating an example of an operational flowchart for material management processing, according to an embodiment.

FIG. 16 is an operational flowchart illustrating an example of a procedure for the material management processing.

[Step S101] The command notification unit 131 of the material management unit 130 transmits the material collection command to the virtual machine 110. In the virtual machine 110, heap dump of data within the memory 111 is performed by the dump file creating unit 112 in response to the material collection command. Data collected by heap dump is stored, for example, into the HDD 103 via the file system 120 as a dump file.

[Step S102] When the dump file is collected, the histogram creation unit 132 creates a histogram of the number of objects for each class included in the collected dump file. For example, the histogram creation unit 132 determines the existing object and a class to which the object belongs, based on information of objects included in the dump file. Then, the histogram creation unit 132 counts, for each class, the number of objects belonging to the class. The histogram creation unit 132 generates a histogram file including the number of objects of each class, and stores the generated histogram file into the HDD 103 via the file system 120.

[Step S103] The leak class identification unit 133 calculates the object increase tendency for each class and identifies a predetermined number of classes having higher increase tendency as a leak class. For example, the leak class identification unit 133 obtains a straight line indicating a transition of the number of objects by linear approximation, and determines the object increase tendency according to an inclination of the straight line. Detail of the leak class identification processing is described later (see FIG. 18).

[Step S104] The material deletion unit 134 determines usefulness of each material by analyzing the histogram of each class. Then, when total data amount of the material exceeds the threshold value, the material deletion unit 134 deletes materials in order from a less useful material. Detail of the material deletion processing is described later (see FIGS. 19 to 21).

[Step S105] After waiting for a predetermined period of time from previous transmission of the material collection command, the command notification unit 131 proceeds to the processing of the step S101 and transmits a next material collection command.

According to such a procedure, material collection and material deletion performed when total data amount of the material exceeds the threshold value, are repeated.

Next, object increase tendency calculation processing is described in detail. For example, a linear approximate straight line of the number of objects is calculated by using a least-squares method. For example, an inclination of the approximate straight line of the number of objects of the class is the increase tendency of the number of objects of the class.

Here, assume that the number of collected materials is n (n is an integer equal to or larger than 1). Also, assume that time when a first material is collected is $x_i$ (i is an integer equal to or greater than 1 and equal to or less than n), and the number of objects in an ith material of a kth class (k is an integer equal to or greater than 1) is $y_{ki}$. In this case, the inclination of the approximate straight line by a least-squares method is expressed by the following formula.

$$\text{Inclination}_k = \frac{n\sum_{i=1}^{n} x_i y_{ki} - \sum_{i=1}^{n} x_i \sum_{i=1}^{n} y_{ki}}{n\sum_{i=1}^{n} x_i^2 - \left(\sum_{i=1}^{n} x_i\right)^2} \quad (1)$$

To identify the leak class by calculation of Formula (1), the leak class identification unit 133 secures, in the memory 102, a storage area used for identifying the leak class.

FIG. 17 illustrates an example of data within a storage area used for the leak class identification processing. For example, the leak class identification unit 133 secures a storage area of the class list 31, material information 32, and class information 33 in the memory 102. The storage area of the class list 31 stores the class ID and class name of each class. The storage area of the material information 32 stores the total of $x_i$, the total of $x_i^2$, and the number of collected materials. The storage area of the class information 33 stores the total of $y_{ki}$, the total of $x_i y_{ki}$, and inclination, in association with the class ID. The leak class identification processing is executed by using such information as illustrated in FIG. 17.

Figure 18:
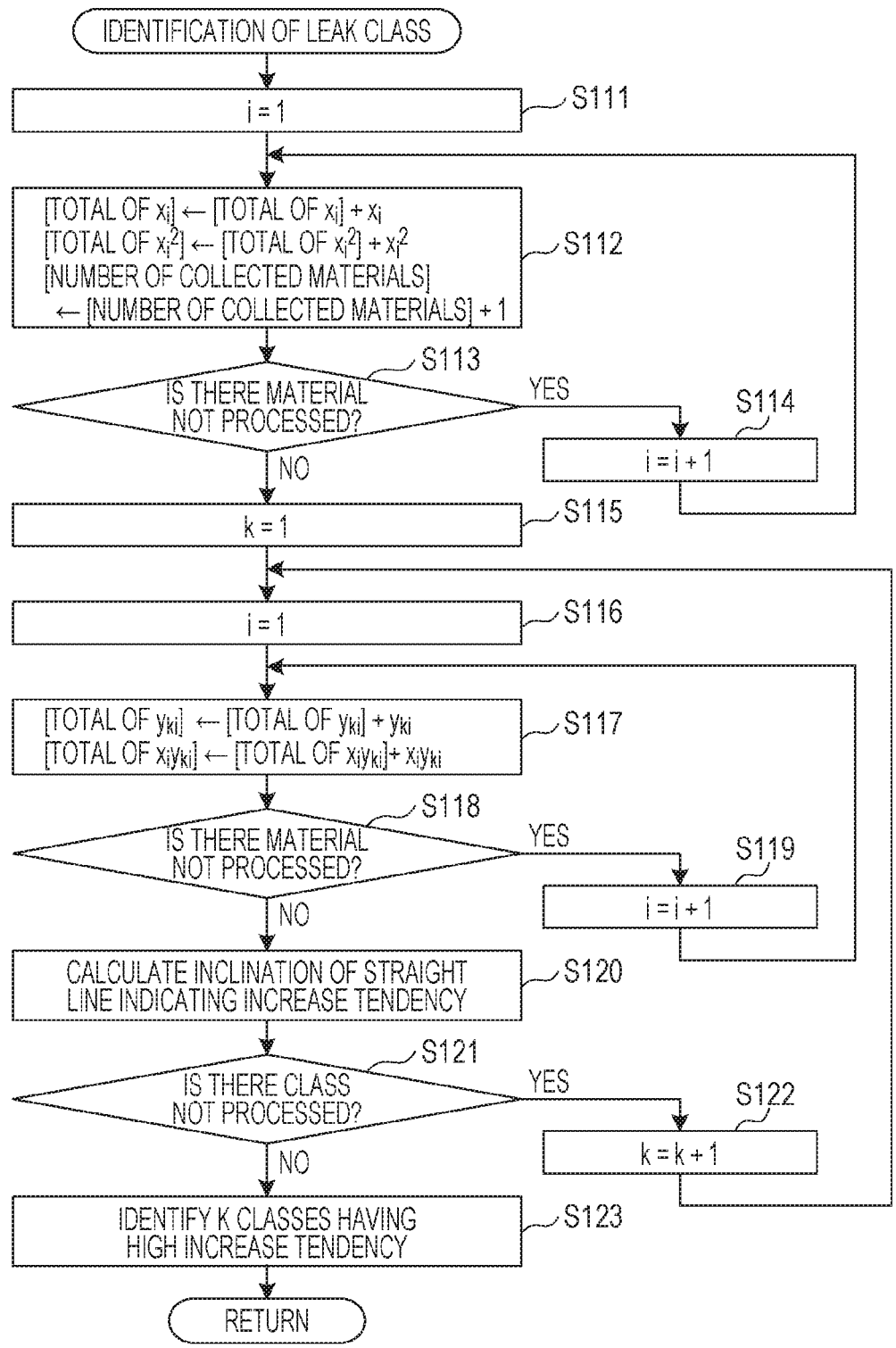
FIG. 18 is a diagram illustrating an example of an operational flowchart for leak class identification processing, according to an embodiment.

FIG. 18 illustrates an example of an operational flowchart for a procedure of the leak class identification processing.

[Step S111] The leak class identification unit 133 initializes the value of variable i to 1.

[Step S112] The leak class identification unit 133 updates the material information 32 with information of ith information out of collected materials. For example, the leak class identification unit 133 adds time $x_i$ of the ith material to the total of $x_i$. Also, the leak class identification unit 133 adds the square of the time $x_i$ of the ith material to the total of $x_i^2$. Further, the leak class identification unit 133 adds 1 to the number of collected materials.

[Step S113] The leak class identification unit 133 determines whether there is a material not processed. When there is a material not processed, processing is proceeded to the step S114. When there is no material not processed, processing is proceeded to the step S115.

[Step S114] The leak class identification unit 133 adds 1 to the variable 1, and proceeds processing to the step S112.

[Step S115] The leak class identification unit 133 initializes the value of variable k to 1.

[Step S116] The leak class identification unit 133 initializes the value of variable i to 1.

[Step S117] The leak class identification unit 133 updates the total of $y_{ki}$ and the total of $x_i y_{ki}$ relative to the kth class within the class information 33. For example, the leak class identification unit 133 adds the number $y_{ki}$ of objects in the ith material of the kth class to the total of $y_{ki}$. Also, the leak class identification unit 133 adds a multiplied value of the time $x_i$ of the ith material and the number $y_{ki}$ of objects in the ith material of the kth class, to the total of $x_i y_{ki}$.

[Step S118] The leak class identification unit 133 determines whether there is a material not processed. When there is a material not processed, processing is proceeded to the step S119. When there is no material not processed, processing is proceeded to the step S120.

[Step S119] The leak class identification unit 133 adds 1 to the variable 1, and proceeds processing to the step S117.

[Step S120] The leak class identification unit 133 calculates the inclination of a straight line indicating the object increase tendency for the kth class. For example, the leak class identification unit 133 calculates the inclination by substituting the value in the material information 32 and the value related to the kth class in the class information 33 in Formula (1). The leak class identification unit 133 sets the calculated inclination to the class information 33 in association with the class ID of the kth class.

[Step S121] The leak class identification unit 133 determines whether there is a class not processed. When there is a class not processed, processing is proceeded to the step S122. When there is no class not processed, processing is proceeded to the step S123.

[Step S122] The leak class identification unit 133 adds 1 to the variable 1, and proceeds processing to the step S116.

[Step S123] The leak class identification unit 133 identifies k classes having higher object increase tendency as the leak class. For example, the leak class identification unit 133 sorts entries for each of classes included in the class information 33 with the inclination in the descending order. Then, the leak class identification unit 133 identifies top k classes as the leak class.

When a plurality of leak classes are identified, the deletion candidate material is determined based on increase or decrease of the number of objects of each leak class. Then, deletion candidate materials are deleted until total data amount of the material becomes equal to or less than the threshold value.

Next, material deletion processing is described with reference to FIGS. 19 to 21. Meaning of variables used in the below description is as follows:

i: Material ID
I: Number of materials (including deleted material)
j: Class ID
J: Number of classes
Y[i][j]: Number of objects in class j included in material i
S={$S_0, S_1, \ldots, S_i, \ldots, S_{I-1}$}: Set of collected materials
k: Index of focused class ID
K: Number of focused classes
X={$X_0, X_1, \ldots, X_k, \ldots, X_{K-1}$}: Set of focused class ID
(0≤k<K, 0≤$X_k$<j)DS [k]: Set of deletion candidate materials of class (ID==$X_k$)
TDS: Set of deletion candidate materials as a whole (product set of DS[0] to DS[K−1])

Figure 19:
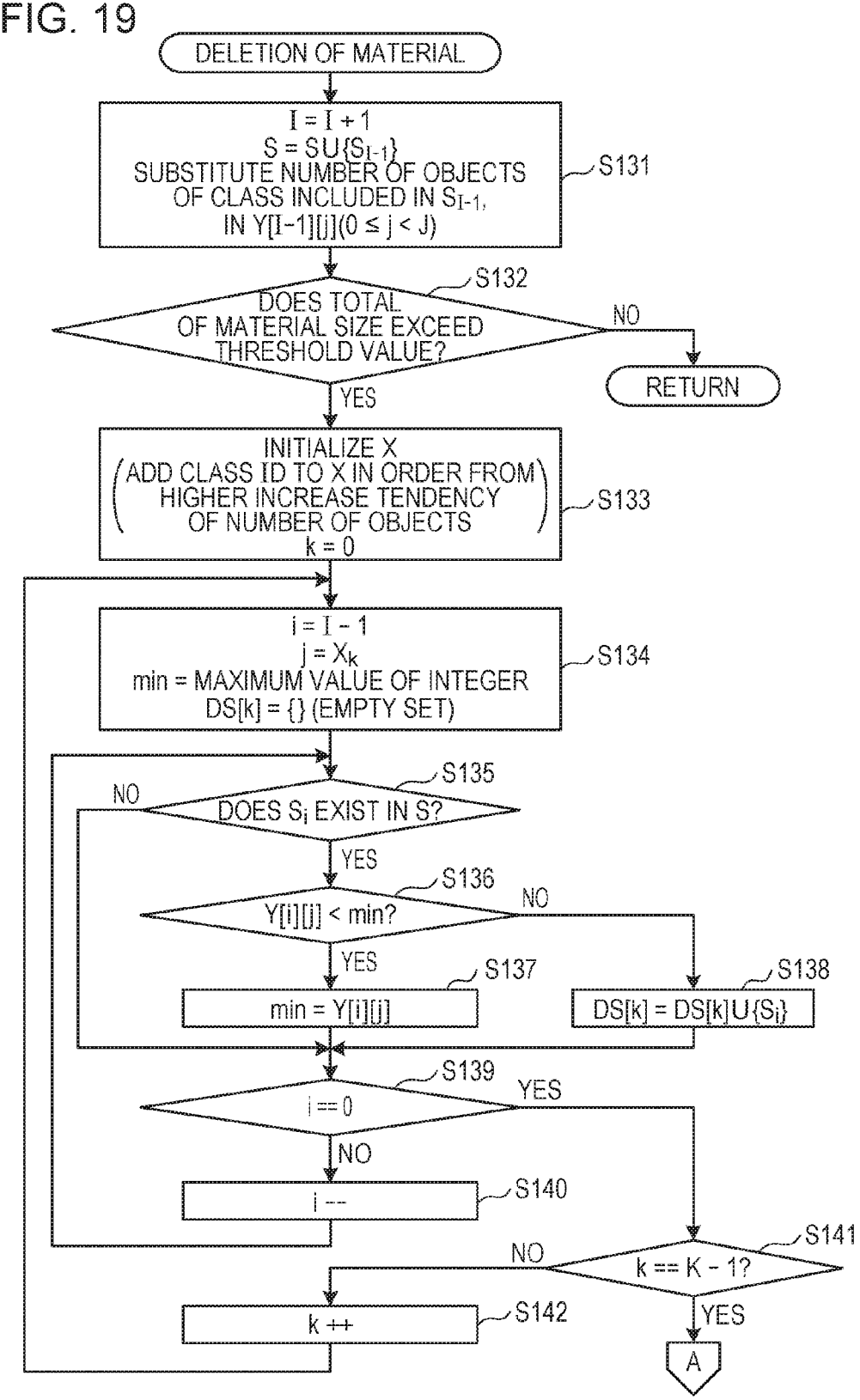
FIG. 19 is a diagram illustrating an example of an operational flowchart for material deletion processing, according to an embodiment.

FIG. 19 is an operational flowchart (1/3) illustrating an example of a procedure for the material deletion processing. FIG. 19 illustrates a process up to determination of the deletion candidate material for each class.

[Step S131] The material deletion unit 134 updates the value of variables based on the newly collected material. For example, the material deletion unit 134 adds 1 to I. Also, the material deletion unit 134 adds a newly collected material (I−1th material) to S. Further, the material deletion unit 134 substitutes the number of objects of each class included in a newly collected material ($S_{I-1}$), in Y[I−1][j] (0≤j<J).

[Step S132] The material deletion unit 134 determines whether total material size (the number of bytes) exceeds the threshold value. When the total material size exceeds the threshold value, processing is proceeded to the step S133. When not exceeding the threshold value, the material deletion processing ends without deleting the material.

[Step S133] The material deletion unit 134 initializes X. For example, the, the material deletion unit 134 adds the class ID to X in order from the class ID of the class having higher increase tendency of the number of objects. The material deletion unit 134 initializes the value of k to [0].

[Step S134] The material deletion unit 134 sets I−1 to i. Also, the material deletion unit 134 sets $X_k$ to j. Also, the material deletion unit 134 sets a maximum value of settable integers to min. Also, the material deletion unit 134 initializes DS[k] to the empty set.

[Step S135] The material deletion unit 134 determines whether $S_i$ exists in S. If $S_i$ is not deleted, $S_i$ exists in S. When $S_i$ exists, processing is proceeded to the step S136. When $S_i$ does not exist, the processing is proceeded to the step S139.

[Step S136] The material deletion unit 134 determines whether the value of Y[i][j] is smaller than min. When the value of Y[i][j] is smaller than min, processing is proceeded to the step S137. When the value of Y[i][j] is equal to or larger than min, processing is proceeded to the step S138.

[Step S137] The material deletion unit 134 sets the value of the current Y[i][j] to min, and proceeds processing to the step S139.

[Step S138] The material deletion unit 134 includes the i-th material $S_i$ in DS[k].

[Step S139] The material deletion unit 134 determines whether the value of i is "0". When the value of i is "0", the processing is proceeded to the step S141. When the value of i is not "0", processing is proceeded to the step S140.

[Step S140] The material deletion unit 134 decrements the value of i (subtracts "1") and proceeds processing to the step S135.

[Step S141] The material deletion unit 134 determines whether the value of k is K−1. When the value of k is K−1, processing is proceeded to the step S151 (see FIG. 20). When the value of k is not K−1, processing is proceeded to the step S142.

[Step S142] The material deletion unit 134 increments the value of the k (adds "1") and proceeds processing to the step S134.

Figure 20:
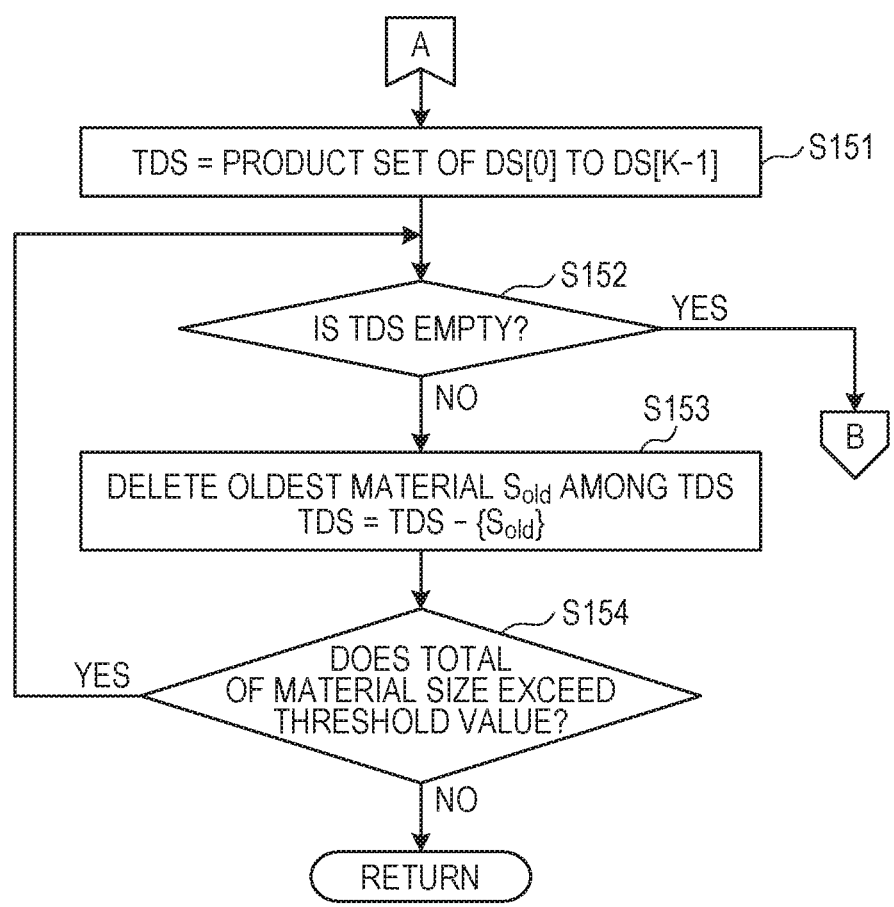
FIG. 20 is a diagram illustrating an example of an operational flowchart for material deletion processing, according to an embodiment.

FIG. 20 is an operational flowchart (2/3) illustrating an example of a procedure for the material deletion processing. FIG. 20 illustrates deletion processing of the material selected as the deletion candidate of each class by the processing of FIG. 19.

[Step S151] The material deletion unit 134 sets the product set of DS[0] to DS[K−1], to TDS.

[Step S152] The material deletion unit 134 determines whether TDS is empty. When TDS is empty, processing is proceeded to the step S161 (see FIG. 21). When TDDS is not empty, processing is proceeded to the step S153.

[Step S153] The material deletion unit 134 deletes a material $S_{old}$ whose collection time is oldest within TDS. For example, the material deletion unit 134 transmits a command of deleting a dump file and a histogram file included in the material $S_{old}$, to the file system 120. Then, the corresponding dump file and histogram file is deleted from the HDD 103 by the file system 120. The material deletion unit 134 also deletes the material $S_{old}$ from the TDS.

[Step S154] The material deletion unit 134 determines whether total material size exceeds the threshold value. When the total material size exceeds the threshold value, processing is proceeded to the step S152. When not exceeding the threshold value, the material deletion processing ends.

In this way, the number of objects is checked in order from a newer (with larger i) material. When the number of objects is smaller than a known minimum value, the minimum value is updated. Otherwise, the material number is added to a set of deletion candidate materials. Upon finishing calculation for all of k classes, a set of deletion candidate materials is calculated with a product set taken from the set of each class. Then, materials included in the set are deleted until total material size does not exceed the threshold value or the set becomes empty. Thus, a material related to an object remaining after object collection may be left behind without being deleted, by checking the number of objects in order from a newer material and leaving behind a material having the smallest number of objects in any class. As a result, an object which has failed to be collected may be found easily by analyzing the remaining material.

Figure 21:
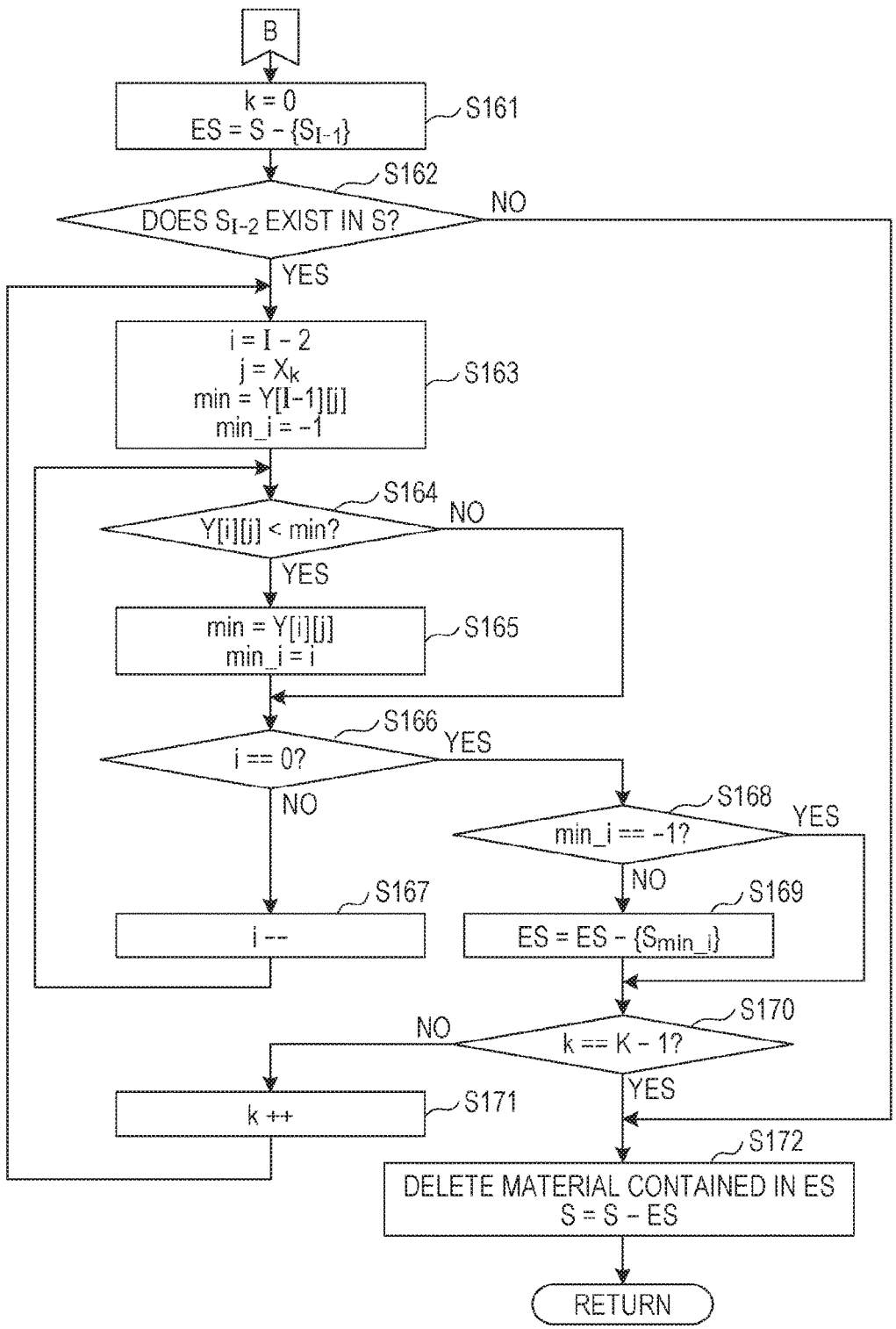
FIG. 21 is a diagram illustrating an example of an operational flowchart for material deletion processing, according to an embodiment.

When the total data amount of materials still exceeds the threshold value even after deleting materials through the processes of FIGS. 19 and 20, further deletion of materials is performed through a process illustrated in FIG. 21.

FIG. 21 is an operational flowchart (3/3) illustrating an example of a procedure for the material deletion processing. FIG. 21 indicates processing of deleting, as a deletion candidate material, materials other than a latest material and materials having the smallest number of objects in each class. A set of materials deleted in the processing of FIG. 21 is referred to an ES.

[Step S161] The material deletion unit 134 initializes the value of k at "0". The material deletion unit 134 sets a set $S-S_{I-1}$ of materials excluding the latest material, to ES.

[Step S162] The material deletion unit 134 determines whether $S_{I-2}$ exists in S. When $S_{I-2}$ exists, processing is proceeded to the step S163. When $S_{I-2}$ does not exist, the processing is proceeded to the step S172.

[Step S163] The material deletion unit 134 sets I−2 to i. Also, the material deletion unit 134 sets $X_k$ to j. Further, the material deletion unit 134 sets the value of Y[I−1][j] to min. Then, the material deletion unit 134 sets the initial value "−1" to min_i (number of the material having the smallest number of objects).

[Step S164] The material deletion unit 134 determines whether the value of Y[i][j] is smaller than min. When the value of Y[i][j] is smaller, processing is proceeded to the step S165. When the value of Y[i][j] is equal to or larger than min, processing is proceeded to the step S166.

[Step S165] The material deletion unit 134 sets the value of Y[i][j] to min. The material deletion unit 134 sets the value of the number i of the material being currently processed, to min_i.

[Step S166] The material deletion unit 134 determines whether the value of i is "0". When the value of i is "0", the processing is proceeded to the step S168. When the value of i is not "0", processing is proceeded to the step S167.

[Step S167] The material deletion unit 134 decrements the value of i and proceeds processing to the step S164.

[Step S168] The material deletion unit 134 determines whether the value of min_i is "−1". The value of min_i becomes "−1" when the number of objects of a material collected finally is smallest. When the value of [min_i] is "−1", the processing is proceeded to the step S170. When the value of min_i is not "−1", processing is proceeded to the step S169.

[Step S169] The material deletion unit 134 deletes $S_{min-i}$ from ES.

[Step S170] The material deletion unit 134 determines whether the value of k is the same as K−1. When the value of k is the same as K−1, processing is proceeded to the step S172. When the value of k is not the same as K−1, processing is proceeded to the step S171.

[Step S171] The material deletion unit 134 increments the value of k (adds "1") and proceeds processing to the step S163.

[Step S172] The material deletion unit 134 deletes materials included in ES. For example, the material deletion unit 134 transmits a command of deleting a dump file and a histogram file of the materials included in ES, to the file system 120. Then, the corresponding dump file and histogram file is deleted from the HDD 103 by the file system 120. The material deletion unit 134 deletes elements indicating materials included in ES from S as well.

As illustrated in FIG. 21, a material including the smallest number of objects is determined for all of the k classes, all materials excluding that material and the latest material become the deletion candidate. The material including the smallest number of objects is considered as a material from which many collectable objects have been collected. Thus, an object which has failed to be collected may be found easily by analyzing the material having the smallest number of objects. The latest material includes all the objects currently existing. Therefore, losing of the trace of an uncollectable object due to deletion of the material may be avoided by leaving behind the latest material without deleting.

As described above, according to the second embodiment, a material especially useful for the cause analysis of the memory leak is left behind and materials having low usefulness may be deleted, by leaving behind materials before generation of objects and materials after collection of objects, and by deleting other materials. As a result, materials effective for analysis of the memory leak may be preserved in a reliable manner while suppressing the total data amount of materials within the threshold value.

Although embodiments of the present disclosure are illustrated as above, configuration of elements illustrated in the embodiments may be replaced with those having similar functions. Furthermore, any other structures and processes may be added thereto. Furthermore, any two or more configurations (features) out of the embodiments described above may be combined.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. A non-transitory, computer-readable recording medium having stored therein a program that causes a computer to execute a process, the process comprising:

generating object-count information indicating a number of objects belonging to each of a plurality of classes, based on plural pieces of dump data acquired at different times from a memory storing objects of the plurality of classes, the plural pieces of dump data being stored in a storage when the plural pieces of dump data are acquired, each piece of dump data being associated with one or more objects and one or more classes;

determining, for each class, at least first dump data from among the plural pieces of dump data, in accordance with the object-count information, the first dump data being associated with a number of objects belonging to each class which, in at least one class, is smaller than numbers of objects belonging to each class associated with second dump data and third dump data, the second dump data being acquired before the first dump data, the third dump data being acquired after the first dump data;

determining deletion candidate data from among the plural pieces of dump data except the first dump data; and executing a deletion of the deletion candidate data from the storage.

2. The non-transitory, computer-readable recording medium of claim 1, wherein the deletion candidate data is determined from among the plural pieces of dump data except the first dump data and a fourth dump data, the fourth dump data being latest dump data of the plural pieces of dump data.

3. The non-transitory, computer-readable recording medium of claim 1, wherein a number of objects belonging to a first class associated with the first dump data is smaller than each number of objects belonging to the first class associated with each other dump data acquired after the first dump data, the other dump data being included in the plural pieces of dump data.

4. The non-transitory, computer-readable recording medium of claim 1, wherein the process further includes:

when a total amount of dump data exceeds a threshold value after the deletion, identifying, for each class, fifth dump data in accordance with the object-count information, the fifth dump data being associated with a minimum number of objects belonging to each class; and determining second deletion candidate data from among the plural pieces of dump data except the fifth dump data and latest dump data; and executing a deletion of the second deletion candidate data from the storage.

5. The non-transitory, computer-readable recording medium of claim 1, wherein the process further includes:

selecting two or more classes, out of the plurality of classes, in descending order of an increased rate of a number of objects belonging to each class; and wherein the deletion candidate data is determined from among the plural pieces of dump data except the first dump data associated with the two or more classes.

6. A method for managing dump data for cause analysis of a memory leak, the method comprising:

generating object-count information indicating a number of objects belonging to each of a plurality of classes, based on plural pieces of dump data acquired at different times from a memory storing objects of the plurality of classes, the plural pieces of dump data being stored in a storage when the plural pieces of dump data are acquired, each dump data being associated with one or more objects and one or more classes;

determining, for each class, at least first dump data from among the plural pieces of dump data in accordance with the object-count information, the first dump data being associated with a number of objects belonging to each class smaller than each of numbers of objects belonging to each class associated with second dump data and third dump data, the second dump data being acquired before the first dump data, the third dump data being acquired after the first dump data;

determining deletion candidate data from among the plural pieces of dump data except the first dump data; and executing a deletion of the deletion candidate data from the storage.

7. An apparatus for managing dump data for cause analysis of a memory leak, the apparatus comprising:

a memory configured to a store objects of a plurality of classes;

a storage device configured to store plural pieces of dump data acquired at different times from the memory, the plural pieces of dump data being stored in the storage device when the plural pieces of dump data are acquired, each dump data being associated with one or more objects and one or more classes; and a processor coupled to the memory and configured to:

generate object-count information indicating a number of objects belonging to each of a plurality of classes, based on the plural pieces of dump data acquired at different times from the memory configured to store objects of the plurality of classes, determine, for each class, at least first dump data from among the plural pieces of dump data in accordance with the object-count information, the first dump data being associated with a number of objects belonging to each class smaller than each of numbers of objects belonging to each class associated with second dump data and third dump data, the second dump data being acquired before the first dump data, the third dump data being acquired after the first dump data;

determine deletion candidate data from among the plural pieces of dump data except the first dump data; and execute a deletion of the deletion candidate data from the storage device.

* * * * *